US010391742B2

(12) United States Patent
Kubota

(10) Patent No.: US 10,391,742 B2
(45) Date of Patent: *Aug. 27, 2019

(54) STEEL FOR CARBURIZING, CARBURIZED STEEL COMPONENT, AND METHOD OF PRODUCING THE SAME

(71) Applicant: NIPPON STEEL & SUMITOMO METAL CORPORATION, Tokyo (JP)

(72) Inventor: Manabu Kubota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 26 days.

This patent is subject to a terminal disclaimer.

(21) Appl. No.: 15/622,712

(22) Filed: Jun. 14, 2017

(65) Prior Publication Data
US 2017/0282501 A1 Oct. 5, 2017

Related U.S. Application Data

(62) Division of application No. 13/818,056, filed as application No. PCT/JP2012/052854 on Feb. 8, 2012, now Pat. No. 9,796,158.

(30) Foreign Application Priority Data

Feb. 10, 2011 (JP) ................. 2011-027279

(51) Int. Cl.
C21D 1/06 (2006.01)
B32B 15/04 (2006.01)
C21D 1/32 (2006.01)
C21D 8/06 (2006.01)
C21D 9/32 (2006.01)
C22C 38/60 (2006.01)
C23C 8/22 (2006.01)
C21D 8/00 (2006.01)
C22C 38/00 (2006.01)
C22C 38/02 (2006.01)
C22C 38/04 (2006.01)
C22C 38/06 (2006.01)
C22C 38/22 (2006.01)
C22C 38/24 (2006.01)
C22C 38/26 (2006.01)
C22C 38/28 (2006.01)
C22C 38/32 (2006.01)
C22C 38/42 (2006.01)
C22C 38/44 (2006.01)
C22C 38/48 (2006.01)
C23C 8/02 (2006.01)
C23C 8/32 (2006.01)
C23C 8/80 (2006.01)
C22C 38/18 (2006.01)
C21D 1/25 (2006.01)

(52) U.S. Cl.
CPC ............ *B32B 15/04* (2013.01); *C21D 1/06* (2013.01); *C21D 1/32* (2013.01); *C21D 8/005* (2013.01); *C21D 8/06* (2013.01); *C21D 8/065* (2013.01); *C21D 9/32* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/18* (2013.01); *C22C 38/22* (2013.01); *C22C 38/24* (2013.01); *C22C 38/26* (2013.01); *C22C 38/28* (2013.01); *C22C 38/32* (2013.01); *C22C 38/42* (2013.01); *C22C 38/44* (2013.01); *C22C 38/48* (2013.01); *C22C 38/60* (2013.01); *C23C 8/02* (2013.01); *C23C 8/22* (2013.01); *C23C 8/32* (2013.01); *C23C 8/80* (2013.01); *C21D 1/25* (2013.01); *C21D 2211/002* (2013.01); *C21D 2211/003* (2013.01); *C21D 2211/004* (2013.01); *C21D 2211/005* (2013.01); *C21D 2211/009* (2013.01)

(58) Field of Classification Search
CPC .................................. B32B 15/04; C21D 1/06
See application file for complete search history.

(56) References Cited

U.S. PATENT DOCUMENTS 6,602,359 B1 * 8/2003 Ochi ..................... C21D 8/06
148/330

FOREIGN PATENT DOCUMENTS

| CN | 101397631 A | 4/2009 |
| JP | 11-335777 A | 12/1999 |
| JP | 2001-240941 A | 9/2001 |
| JP | 2001-303172 A | 10/2001 |
| JP | 2002-155344 A | 5/2002 |
| JP | 2003-231917 A | 8/2003 |
| JP | 2005-220423 A | 8/2005 |
| JP | 2007-289979 A | 11/2007 |
| JP | 2008-291128 A | 12/2008 |
| JP | 2008-291298 A | 12/2008 |
| JP | 2009-30160 A | 2/2009 |
| JP | 2009-68064 A | 4/2009 |
| JP | 2009-108398 A | 5/2009 |

(Continued)

OTHER PUBLICATIONS

Chinese Office Action dated Aug. 4, 2014, issued in Chinese Patent Application No. 201280003024.1.

(Continued)

*Primary Examiner* — Veronica F Faison
(74) *Attorney, Agent, or Firm* — Birch, Stewart, Kolasch & Birch, LLP

(57) ABSTRACT

A steel for a carburizing and a carburized steel component having a steel portion and a carburized layer with a thickness of more than 0.4 mm to less than 2 mm which is formed on an outside of the steel portion. A chemical composition of the steel for the carburizing and the steel portion of the carburized steel component satisfies simultaneously equations of a hardness parameter, a hardenability parameter, and an AlN precipitation parameter.

14 Claims, No Drawings

(56) References Cited

FOREIGN PATENT DOCUMENTS

| | | |
|---|---|---|
| JP | 2010-163666 A | 7/2010 |
| WO | WO 2010/082481 A1 | 7/2010 |
| WO | WO 2010/116670 A1 | 10/2010 |

OTHER PUBLICATIONS

Chinese Office Action dated Jul. 7, 2014, issued in Chinese Patent Application No. 201280002860.8.
International Search Report issued in PCT/JP2012/052383, dated Apr. 24, 2012.
International Search Report issued in PCT/JP2012/052854, dated Apr. 24, 2012.
Final Office Action dated Aug. 2, 2016, issued in U.S. Appl. No. 13/818,056.
Korean Notice of Allowance, dated Nov. 19, 2014, for Korean Application No. 10-2013-7007148.
Leslie, "The Physical Metallurgy of Steels", Maruzen Co., Ltd., 1985, 15 pages.
Non-Final Office Action dated Feb. 1, 2016, issued in U.S. Appl. No. 13/818,056.
Notice of Allowance dated Mar. 14, 2017, issued in U.S. Appl. No. 13/818,056.
Pickering, "Physical Metallurgy and the Design of Steels", Maruzen Co., Ltd., 1991, 9 pages.
Restriction Requirement dated Aug. 27, 2015, issued in U.S. Appl. No. 13/818,056.
Supplemental Notice of Allowance dated Mar. 28, 2017, issued in U.S. Appl. No. 13/818,056.

\* cited by examiner

STEEL FOR CARBURIZING, CARBURIZED STEEL COMPONENT, AND METHOD OF PRODUCING THE SAME

This application is a Divisional of U.S. patent application Ser. No. 13/818,056, filed on Feb. 20, 2013, which is now U.S. Pat. No. 9,796,158, which is the National Stage Entry of PCT International Application No. PCT/JP2012/052854, filed on Feb. 8, 2012, which claims the priority benefit of Japanese Patent Application No. 2011-027279, filed on Feb. 10, 2011, the full contents of all of which are hereby incorporated by reference in their entirety.

TECHNICAL FIELD

The present invention relates to a steel for carburizing, a carburized steel component, and a method of producing the same, which have small deformation resistance and large critical working ratio at a cold forging, and which have, after a carburizing heat treatment, a hardened layer and hardness of steel portion which are equivalent to a conventional steel.

BACKGROUND ART

In general, Mn, Cr, Mo, Ni, and the like are added in combination to a steel used for mechanical and structural components. A steel for carburizing which has the chemical composition and is produced by casting, forging, rolling, and the like is subjected to shaping such as forging and machining which is cutting and the like and subjected to heat treatments such as carburizing and the like, and then the steel for carburizing becomes a carburized steel component with a carburized layer which is a hardened layer in a surface layer and a steel portion which is a base metal that is not influenced by the carburizing treatment.

In producing cost of the carburized steel component, cost for the cutting is particularly high. The cutting is disadvantageous to a yield, because tools for the cutting are not only expensive, but also the cutting forms a large amount of chips. Thus, replacing the cutting with the forging is attempted. The forging method is divided roughly into a hot forging, a warm forging, and a cold forging. The warm forging has a feature in which scale formation is not much and dimensional accuracy is improved as compared with the hot forging. The cold forging has a feature in which the scale formation is little and the dimensional accuracy is close to the cutting. Thus, it is tried that the cold forging is performed as a finishing after the hot forging is performed as a rough shaping, that the cutting is slightly performed as the finishing after the warm forging is performed, or that the cold forging is only performed for the shaping. However, since mold life decreases with increase in contact pressure to the mold in a case that deformation resistance of the steel for carburizing is large when replacing the cutting with the warm forging or the cold forging, advantage of the cost against the cutting becomes small. Or problems such that cracks are initiated and propagated at an area where large deformation is applied and the like occur when forming into complex shape. For the reason, various techniques have been investigated in order to soften the steel for carburizing and to improve critical working ratio.

For example, Patent Documents 1 and 2 suggest the steel for carburizing which is softened by decreasing Si and Mn content in order to improve cold forgeability. The steels for carburizing have sufficient hardness of steel portion and effective case depth (depth where Vickers hardness is HV550 or more) after the carburizing and have properties satisfied as the carburized steel component. However, it is insufficient to decrease drastically the deformation resistance at the forging. In contrast, Patent Document 3 suggests the steel for carburizing in which the deformation resistance at the hot forging, the warm forging, and the cold forging is drastically decreased by decreasing considerably C content to 0.001% to 0.07% or less as compared with the conventional steel for carburizing and in which effective hardened layer after the carburizing that is reduced due to the decrease in C content is improved by controlling the amount of additive elements except C. However, the hardness of the steel for carburizing decreases by excessively low C content as the steel, and the hardness of steel portion of the carburized steel component which is not influenced by the carburizing is insufficient. Therefore, a problem such that versatility has restriction occurs. Patent Document 4 suggests the steel for carburizing which is excellent in ductility and is able to be utilized for the cold forging with large working ratio by improving metallographic structure of the surface layer of the steel for carburizing whose shape is a bar and wire rod by spheroidizing annealing. The critical working ratio of the steel for carburizing is improved, and the cracks which are initiated and propagated at the cold forging can be prevented. Moreover, the steel for carburizing has satisfiable properties as the carburized steel component in regard to the hardness of steel portion and the effective case depth after the carburizing. However, the steel for carburizing is ineffective in decreasing in the deformation resistance at the forging, and an improvement such as a decrease in forging load, a prolongation of the mold life, and the like should be performed.

As mentioned above, it is fact that the technique satisfying all properties such as the drastic decrease in the deformation resistance at the forging, the improvement of the critical working ratio, the securement of the properties as the carburized steel component, and especially the securement of the effective case depth and the hardness of steel portion is not found.

RELATED ART DOCUMENT

Patent Documents

[Patent Document 1] Japanese Unexamined Patent Application, First Publication No. H11-335777
[Patent Document 2] Japanese Unexamined Patent Application, First Publication No. 2001-303172
[Patent Document 3] Japanese Unexamined Patent Application, First Publication No. 2009-108398
[Patent Document 4] Japanese Unexamined Patent Application, First Publication No. 2001-240941

SUMMARY OF INVENTION

Technical Problem

In view of the above-mentioned problems, an object of an aspect of the invention is to provide a steel for carburizing, a carburized steel component, and a method of producing the same, which have, in the state of the steel for carburizing, small deformation resistance and large critical working ratio at a cold forging as compared with the conventional steel for carburizing, and which have, after a carburizing heat treatment, a hardened layer and hardness of steel portion which are equivalent to a conventional steel.

Hereafter, "forging" only indicates "cold forging." unless otherwise mentioned.

Solution to Problem

In order to solve the problems, the inventor has investigated and then found the following results. In order to decrease the hardness of the steel for carburizing and to improve the critical working ratio, C content needs to be decreased as much as possible. On the other hand, in order to obtain the hardness of steel portion required at least as the carburized steel component, C content has a lower limit and needs to be controlled in the target range. In order to satisfy both securing hardenability to obtain the hardness of steel portion required as the carburized steel component and aiming at the decrease in the hardness as the steel for carburizing on condition that C content in chemical composition is less than that of the conventional steel, it is necessary to utilize an improvement effect of the hardenability obtained by B addition and to be the chemical composition in which a hardenability parameter and a hardness parameter which are derived by the inventor are simultaneously satisfied. In addition, in order to stably obtain the improvement effect of the hardenability by B addition, and further in order to prevent the grain coarsening at the carburizing, an AlN precipitation parameter which is derived by the inventor needs to be satisfied.

An aspect of the present invention employs the following.

(1) A steel for a carburizing according to an aspect of the invention includes as a chemical composition, by mass %,
C: 0.07% to 0.13%,
Si: 0.0001% to 0.50%,
Mn: 0.0001% to 0.80%,
S: 0.0001% to 0.100%,
Cr: more than 1.30% to 5.00%,
B: 0.0005% to 0.0100%,
Al: 0.070% to 0.200%,
N: 0.0030% to 0.0100%,
Ti: limited to 0.020% or less,
P: limited to 0.050% or less,
O: limited to 0.0030% or less, and
a balance consisting of iron and unavoidable impurities,
wherein amounts expressed in mass % of each element in the chemical composition satisfy simultaneously a following Equation 1 as a hardness parameter, a following Equation 2 as a hardenability parameter, and a following Equation 3 as an AlN precipitation parameter.

$$0.10 < C + 0.194 \times Si + 0.065 \times Mn + 0.012 \times Cr + 0.078 \times Al < 0.235 \quad \text{(Equation 1)}$$

$$7.5 < (0.7 \times Si + 1) \times (5.1 \times Mn + 1) \times (2.16 \times Cr + 1) < 44 \quad \text{(Equation 2)}$$

$$0.0003 < Al \times (N - Ti \times (14/48)) < 0.0011 \quad \text{(Equation 3)}$$

(2) The steel for the carburizing according to (1) may further includes as the chemical composition, by mass %, at least one of Nb: 0.002% to 0.100%, V: 0.002% to 0.20%, Mo: 0.005% to 0.50%, Ni: 0.005% to 1.00%, Cu: 0.005% to 0.50%, Ca: 0.0002% to 0.0030%, Mg: 0.0002% to 0.0030%, Te: 0.0002% to 0.0030%, Zr: 0.0002% to 0.0050%, Rare Earth Metal: 0.0002% to 0.0050%, and Sb: 0.002% to 0.050%, wherein the hardness parameter is defined as a following Equation 4 on behalf of the Equation 1 and the hardenability parameter is defined as a following Equation 5 on behalf of the Equation 2.

$$0.10 < C + 0.194 \times Si + 0.065 \times Mn + 0.012 \times Cr + 0.033 \times Mo + 0.067 \times Ni + 0.097 \times Cu + 0.078 \times Al < 0.235 \quad \text{(Equation 4)}$$

$$7.5 < (0.7 \times Si + 1) \times (5.1 \times Mn + 1) \times (2.16 \times Cr + 1) \times (3 \times Mo + 1) \times (0.3633 \times Ni + 1) < 44 \quad \text{(Equation 5)}$$

(3) In the steel for the carburizing according to (1) or (2), a metallographic structure may include, by area %, a ferrite and a pearlite of 85% to 100% in total.

(4) In the steel for the carburizing according to (3), the metallographic structure may include, by area %, the ferrite and spheroidal cementites of 85% to 100% in total.

(5) In the steel for the carburizing according to (1) or (2), a shape may be a bar or a wire rod in which a cross section perpendicular to a longitudinal direction is round, and when a distance from a periphery to a center of the cross section is defined as r in unit of mm, in a metallographic structure of a surface layer which is a portion from the periphery to r×0.01, a ferrite and a pearlite may be limited, by area %, to 10% or less in total, and a balance may include at least one of martensite, bainite, tempered martensite, tempered bainite, and cementites.

(6) In the steel for the carburizing according to (5), in the cementites included in the metallographic structure of the surface layer, the cementites of 90% to 100% may be cementites whose aspect ratio is 3 or less.

(7) A method of producing the steel for the carburizing according to any one of (1) to (3) may include: a casting process to obtain a bloom; a hot working process of hot-working the bloom to obtain a hot worked steel material; and a slow cooling process of slow-cooling by a cooling rate of more than 0° C./s to 1° C./s in a temperature range where a surface temperature of the hot worked steel material is 800° C. to 500° C. after the hot working process.

(8) The method of producing the steel for the carburizing according to any one of (1) to (4) and (7) may further include a spheroidizing annealing process of spheroidizing-annealing the hot-worked steel material after the slow cooling process.

(9) The method of producing the steel for the carburizing according to any one of (1), (2), and (5) may include: a casting process to obtain a bloom; a hot controlled rolling process of hot-rolling the bloom by controlling conditions so that a surface temperature at an exit side of a final finish rolling becomes 700° C. to 1000° C. to obtain a hot-controlled-rolled steel material; a rapid cooling process of rapid-cooling so that the surface temperature of the hot-controlled-rolled steel material is more than 0° C. to 500° C. after the hot controlled rolling process; and a self-reheating process of self-reheating the hot-controlled-rolled steel material after the rapid cooling process at least one time or more.

(10) The method of producing the steel for the carburizing according to any one of (1), (2), (5), (6), and (9) may further include
a spheroidizing annealing process of spheroidizing-annealing the hot-controlled-rolled steel material after the self-reheating process.

(11) A carburized steel component according to an aspect of the invention includes a steel portion and a carburized layer with a thickness of more than 0.4 mm to less than 2 mm which is formed on an outside of the steel portion: wherein, in the carburized layer, a Vickers hardness at a position of 50 μm in depth from a surface is HV 650 to HV 1000, a Vickers hardness at a position of 0.4 mm in depth from the surface is HV 550 to HV 900, and a metallographic structure at the position of 0.4 mm in depth from the surface includes by area % martensite of 90% to 100%; and wherein, in the steel portion at a position of 2 mm in depth from the surface, a chemical composition consists of the chemical composition according to (1) or (2), and a Vickers hardness is HV 250 to HV 500.

(12) A method of producing the carburized steel component according to (11) may include: a cold working process of cold-working the steel for the carburizing to give a shape; a carburizing process of carburizing or carbonitriding the steel for the carburizing after the cold working process; and a finish heat treatment process of quenching or quenching and tempering after the carburizing process.

(13) The method of producing the carburized steel component according to (11) or (12) may further include, a cutting process of cutting to give a shape after cold working process and before the carburizing process.

Advantageous Effects of Invention

According to the above aspects of the present invention in regard to the steel for the carburizing, the carburized steel component, and the method of producing the same, it is possible to provide a steel for carburizing, a carburized steel component, and a method of producing the same, which have, in the state of the steel for carburizing, small deformation resistance and large critical working ratio at a cold forging as compared with the conventional steel for carburizing, and which have, after a carburizing heat treatment, a hardened layer and hardness of steel portion which are equivalent to a conventional steel. As a result, the carburized steel component, which has a shape of a gear and the like and which is conventionally produced by processes such as a hot forging, a normalizing, a cutting, a carburizing and the like, can be produced by processes of a cold forging and the carburizing. Thereby, it is possible to reduce the cost for the cutting, to improve the yield, and to produce the carburized steel component by the cold forging with a shape which cannot be conventionally produced by the cutting. Moreover, for the carburized steel component which is conventionally produced by the processes of the cold forging and the carburizing also, forgeability is greatly improved. Thereby, it is possible to improve mold life and to form the carburized steel component into more complex shapes.

DESCRIPTION OF EMBODIMENTS

Hereinafter, a preferable embodiment of the present invention will be described in detail.

Through thorough research in order to obtain simultaneously both properties of a steel for carburizing before a forging, such as a decrease in deformation resistance (decrease in hardness) and an improvement of critical working ratio, and properties of a carburized steel component after a carburizing heat treatment (such as an improvement of effective case depth and hardness of steel portion), the inventor has acquired the following knowledge (a) to (g).

(a) The steel for carburizing before the forging can be softened with a decrease in C content. However, in chemical composition with ultra low C content, it is impossible to bring the properties of the carburized steel component after the carburizing heat treatment (for example, the effective case depth and the hardness of the steel portion) close to that of conventional steel for carburizing with C content of approximately 0.20% (for example, JIS-SCR420). In order to obtain the hardness of the steel portion required at least as the carburized steel component, a lower limit of C content exists.

(b) In order to obtain the effective case depth and the hardness of the steel portion as much as possible with C content as low as possible, it is necessary to increase the fraction of martensite in metallographic structure at the steel portion of the carburized steel component.

(c) In order to increase the fraction of the martensite in the metallographic structure at the steel portion of the carburized steel component, it is necessary to increase amount of alloying elements such as Mn, Cr, Mo, Ni, and the like which improve hardenability of the steel so as to satisfy an equation of a hardenability parameter as described below.

(d) On the other hand, the increase in the amount of the alloying elements leads to adverse effect such that the hardness of the steel for carburizing increases by effect of solute strengthening of ferrite derived from the alloying elements. Thus, it is necessary to utilize addition effect of B which improves the hardenability by ultra low addition but hardly increases the hardness of the ferrite and necessary to control the amount of C and the alloying elements so as to satisfy an equation of a hardness parameter which is derived by the inventor as described below.

(e) In order to obtain stably the improvement effect of the hardenability of B, it is necessary to prevent B from precipitating as BN and to dissolve B in the steel as solid-solution by fixing most of N contained in the steel as AlN during the carburizing heat treatment. Thus it is necessary to add stoichiometrically excessive Al as compared with N content. Moreover, in order to prevent abnormal grain growth of austenite grain during the carburizing heat treatment, it is necessary to precipitate dispersedly AlN in the metallographic structure as much and fine as possible. As described above, in order to secure the solid-soluted B and to precipitate dispersedly AlN voluminously and finely, it is necessary to control the amount of Al, N, and Ti so as to satisfy an equation of an AlN precipitation parameter which is derived by the inventor as described below.

(f) B addition is very effective in improving the hardenability of the steel portion of the carburized steel component as above-mentioned. However, when gas carburizing is conducted by converted gas method, it is not expected to obtain the improvement effect of the hardenability by B addition in a carburized layer which is a surface layer of the carburized steel component. The reasons are that N penetrates from atmosphere into the surface layer of the carburized steel component during the carburizing treatment, the solid-soluted B precipitates as BN, and the amount of the solid-soluted B which contributes to the improvement of the hardenability becomes insufficient. Thus, in order to secure the hardenability in the carburized layer which is the surface layer of the carburized steel component, it is necessary to satisfy the equation of the hardenability parameter as described above (c).

(g) In order to soften further the steel for carburizing, it is preferable to perform slow cooling on conditions as described below after hot rolling or hot forging at producing the steel for carburizing. Thereby it is possible to control the metallographic structure of the steel for carburizing and to soften further the steel for carburizing. Otherwise, rapid cooling may be performed on conditions as described below after the hot rolling at producing the steel for carburizing, and then spheroidizing annealing may be performed. Thereby it is possible to enhance ductility by improving the metallographic structure of the surface layer of the steel for carburizing and to obtain the steel for carburizing with large critical working ratio.

Hereinafter, limitation range and reasons for the limitation of base elements of the steel for carburizing and the steel portion of the carburized steel component according to the embodiment will be described. In addition, % as described below is mass %.

C: 0.07% to 0.13%

C (Carbon) is added to secure the hardness of the steel portion in the carburized steel component which includes the carburized layer and the steel portion. As described above, C content of the conventional steel for carburizing is approximately 0.2%. In the steel for carburizing and the steel portion of the carburized steel component according to the embodiment, C content is limited to 0.13% or less which is less than the conventional value. The reasons are that, when C content is more than 0.13%, the fraction of cementites and pearlite in the metallographic structure of the steel for carburizing increases, the hardness of the steel for carburizing before the forging increases notably, and the critical working ratio also decreases. On the other hand, when C content is less than 0.07%, it is impossible to bring the hardness of the steel portion of the carburized steel component to that of the conventional steel for carburizing even if the hardness is increased as much as possible by adding a large amount of the alloying elements as described below which improve the hardenability. Therefore, C content needs to be controlled to the range of 0.07% to 0.13%. Preferable range is 0.08% to 0.12%. More preferable range is 0.08% to 0.11%.

Si: 0.0001% to 0.50%

Si (Silicon) is an element which improves tooth surface fatigue strength by increasing considerably resistance to temper softening of low-temperature-tempered martensite steel such as the carburized steel component. To obtain the effect, Si content needs to be 0.0001% or more. On the other hand, when Si content is more than 0.50%, the hardness of the steel for carburizing before the forging increases, the deformation resistance increases, and the critical working ratio decreases. Therefore, Si content needs to be controlled to the range of 0.0001% to 0.50%. Within the range, Si is added intentionally in case that the tooth surface fatigue strength of the carburized steel component is regarded as important, and Si is decreased intentionally in case that a decrease in the deformation resistance and an improvement of the critical working ratio are regarded as important. In the former case, preferable range is 0.10% to 0.50%. In the latter case, preferable range is 0.0001% to 0.20%.

Mn: 0.0001% to 0.80%

Mn (Manganese) is an element which enhances the hardenability of the steel. In order to increase the fraction of the martensite after the carburizing heat treatment by the effect, Mn content needs to be 0.0001% or more. On the other hand, when Mn content is more than 0.80%, the hardness of the steel for carburizing before the forging increases, the deformation resistance increases, and the critical working ratio decreases. Therefore, Mn content needs to be controlled to the range of 0.0001% to 0.80%. Preferable range is 0.25% to 0.60%.

S: 0.0001% to 0.100%

S (Sulfur) is an element which forms MnS by bonding to Mn and improves machinability. To obtain the effect, S content needs to be 0.0001% or more. On the other hand, when S content is more than 0.100%, cracks may be initiated at MnS as fracture origin during the forging, and the critical working ratio may decrease. Therefore, S content needs to be controlled to the range of 0.0001% to 0.100%. Preferable range is 0.003% to 0.020%.

Cr: more than 1.30% to 5.00%

Cr (Chromium) is an element which enhances the hardenability of the steel. In order to increase the fraction of the martensite after the carburizing heat treatment by the effect, Cr content needs to be more than 1.30%. On the other hand, when Cr content is more than 5.00%, the hardness of the steel for carburizing before the forging increases, the deformation resistance increases, and the critical working ratio decreases. Therefore, Cr content needs to be controlled to the range of more than 1.30% to 5.00%. Moreover, Cr has little influence which increases the hardness of the steel for carburizing as compared with other elements such as Mn, Mo, and Ni which have the same effect, and Cr is relatively effective in improving the hardenability. Therefore, in the steel for carburizing and the steel portion of the carburized steel component according to the embodiment, the large amount of Cr is added as compared with the conventional steel for carburizing. Preferable range is 1.35% to 2.50%. More preferable range is more than 1.50% to 2.20%.

B: 0.0005% to 0.0100%

B (Boron) is an element which enhances the hardenability of the steel by low addition in case of solid-soluting in the austenite. The fraction of the martensite after the carburizing heat treatment can increase by the effect. Moreover, since it is not necessary to add a large amount of B to obtain the effect, the hardness of the ferrite hardly increases. Namely, since there is the feature in which the hardness of the steel for carburizing before the forging hardly increases, B is intentionally utilized in the steel for carburizing and the steel portion of the carburized steel component according to the embodiment. When B content is less than 0.0005%, the improvement effect of the hardenability is not obtained. On the other hand, when B content is more than 0.0100%, the effect is saturated. Therefore, B content needs to be controlled to the range of 0.0005% to 0.0100%. Preferable range is 0.0010% to 0.0025%. In addition, when N of a certain amount or more exists in the steel, B forms BN by bonding to N, and the amount of the solid-soluted B decreases. As a result, the effect of improving the hardenability may not be obtained. Thus, in case of adding B, it is necessary to add simultaneously a suitable amount of Al for fixing N.

Al: 0.070% to 0.200%

Al (Aluminum) is an element which has the effect of fixing N in the steel as AlN. By Al addition, the formation of BN is prevented, and the solid-soluted B which contributes to the hardenability is secured. Moreover, AlN which is formed has pinning effect of preventing grains from coarsening during the carburizing. When Al content is less than 0.070%, the improvement effect of the hardenability by B addition is not obtained. On the other hand, when Al content is more than 0.200%, a precipitation amount of AlN increases excessively, and plastic deformability of the steel for carburizing and the carburized steel component deteriorates. Moreover, when Al content is more than 0.200%, AlN precipitates do not disperse finely, and each size grows. As a result, the effect to prevent the grain coarsening is not obtained. Therefore, Al content needs to be controlled to the range of 0.070% to 0.200%. Preferable range is 0.075% to 0.15%.

N: 0.0030% to 0.0100%

N (Nitrogen) is an element which is dissolved in the steel from the atmosphere and which is contained unavoidably in the steel. When N content is less than 0.0030%, the precipitation amount of AlN decreases, the effect to prevent the grain coarsening is not obtained. On the other hand, when N content is more than 0.0100%, even if Al is added, it is difficult to fix N in the steel as AlN and to secure the solid-soluted B which contributes to the hardenability. Moreover, coarse TiN is formed and acts as the fracture origin of the cracks during the deformation. Therefore, N content needs to be controlled to the range of 0.0030% to 0.0100%. Preferable range is 0.0040% to 0.0090%.

In addition to the above mentioned base elements, the steel for carburizing and the steel portion of the carburized steel component according to the embodiment include unavoidable impurities. Herein, the unavoidable impurities indicate elements such as Ti, P, O, Pb, Sn, Cd, Co, Zn, and the like which contaminate unavoidably from auxiliary materials such as scrap and the like and from producing processes. In the elements, Ti, P, and O needs to be limited to the following in order to obtain satisfactory the effect of an aspect of the present invention. In addition, % as described below is mass %. Moreover, although a limited range of the unavoidable impurities includes 0%, it is industrially difficult to be stably 0%.

Ti: 0.020% or less

Ti (Titanium) is an element which has the effect of fixing N in the steel as TiN. When Ti is included, most of N in the steel is fixed as TiN. However, Ti is an expensive element, so that the producing costs rises when Ti is added. On the other hand, when it is difficult to control N content in the steel such as the steel produced by the electric furnace, Ti may be utilized in order to control an amount of solid-soluted N by adding intentionally an appropriate amount of Ti. In the case, addition of excessive Ti results in the producing costs rise. Therefore, from the above point of view, Ti content needs to be limited to 0.020% or less. Preferably, it is 0.015% or less.

P: 0.050% or less

P (Phosphorus) is the impurity contained unavoidably and an element which is segregated at austenite grain boundary, embrittles prior austenite grain boundary, and results in intergranular cracking. When P content is more than 0.050%, the influence becomes excessive. Therefore, P content needs to be limited to 0.050% or less. Preferably, it is 0.020% or less. Since it is preferable that P content is as small as possible, the limited range includes 0%. However, it is not technically easy to control P content to be 0%, and also the production cost of the steel increases in order to be stably less than 0.0030%. Thus, preferable limited range of P content is 0.003% to 0.050%. More preferable limited range of P content is 0.003% to 0.015%. Generally, in ordinary producing condition, P of approximately 0.025% is contained unavoidably.

O: 0.0030% or less

O (Oxygen) is the impurity contained unavoidably and an element which forms oxide inclusions. When 0 content is more than 0.0030%, coarse inclusions which act as the fracture origin of fatigue cracking increase, which results in a decrease in fatigue properties. Therefore, O content needs to be limited to 0.0030% or less. Preferably, it is 0.0015% or less. Since it is preferable that O content is as small as possible, the limited range includes 0%. However, it is not technically easy to control O content to be 0%, and also the production cost of the steel increases in order to be stably less than 0.0007%. Thus, preferable limited range of O content is 0.0007% to 0.0030%. More preferable limited range of O content is 0.0007% to 0.0015%. Generally, in ordinary producing condition, O of approximately 0.0020% is contained unavoidably.

In addition to the above mentioned base elements and impurities, the steel for carburizing and the steel portion of the carburized steel component according to the embodiment may further include, as selective elements, at least one of Nb, V, Mo, Ni, Cu, Ca, Mg, Te, Zr, REM, and Sb.

Hereinafter, limitation range and reasons for the limitation of the selective elements will be described. In addition, % as described below is mass %.

In the selective elements, Nb and V are effective in preventing the grain coarsening.

Nb: 0.002% to 0.100%

Nb (Niobium) is an element which forms Nb(C,N) by bonding to N and C in the steel. Nb(C,N) suppresses the grain growth by pinning the austenite grain boundary, and thereby prevents microstructure from coarsening. When Nb content is less than 0.002%, the effect is not obtained. When Nb content is more than 0.100%, the effect is saturated. Therefore, it is preferable that Nb content is 0.002% to 0.100%. More preferably, it is 0.010% to 0.050%.

V: 0.002% to 0.20%

V (Vanadium) is an element which forms V(C,N) by bonding to N and C in the steel. V(C,N) suppresses the grain growth by pinning the austenite grain boundary, and thereby prevents the microstructure from coarsening. When V content is less than 0.002%, the effect is not obtained. When V content is more than 0.20%, the effect is saturated. Therefore, it is preferable that V content is 0.002% to 0.20%. More preferably, it is 0.05% to 0.10%.

In the selective elements, Mo, Ni, and Cu are effective in increasing the fraction of the martensite at the carburizing heat treatment.

Mo: 0.005% to 0.50%

Mo (Molybdenum) is an element which enhances the hardenability of the steel. In order to increase the fraction of the martensite after the carburizing heat treatment by the effect, it is preferable that Mo content is more than 0.005%. Moreover, Mo is the element which does not form oxides and hardly forms nitrides under gas atmosphere of the gas carburizing. By Mo addition, an oxide layer, a nitride layer, or an abnormal carburized layer due to the oxide layer or the nitride layer are hardly formed on the surface of the carburized layer. However, addition cost of Mo is expensive. In addition, when Mo content is more than 0.50%, the hardness of the steel for carburizing before the forging increases, the deformation resistance increases, and the critical working ratio decreases. Therefore, it is preferable that Mo content is 0.005% to 0.50%. More preferably, it is 0.05% to 0.20%.

Ni: 0.005% to 1.00%

Ni (Nickel) is an element which enhances the hardenability of the steel. In order to increase the fraction of the martensite after the carburizing heat treatment by the effect, it is preferable that Ni content is more than 0.005%. Moreover, Ni is the element which does not form oxides and nitrides under the gas atmosphere of the gas carburizing. By Ni addition, the oxide layer, the nitride layer, or the abnormal carburized layer due to the oxide layer or the nitride layer are hardly formed on the surface of the carburized layer. However, addition cost of Ni is expensive. In addition, when Ni content is more than 1.00%, the hardness of the steel for carburizing before the forging increases, the deformation resistance increases, and the critical working ratio decreases. Therefore, it is preferable that Ni content is 0.005% to 1.00%. More preferably, it is 0.05% to 0.50%.

Cu: 0.005% to 0.50%

Cu (Copper) is an element which enhances the hardenability of the steel. In order to increase the fraction of the martensite after the carburizing heat treatment by the effect, it is preferable that Cu content is more than 0.005%. Moreover, Cu is the element which does not form oxides and nitrides under the gas atmosphere of the gas carburizing. By Cu addition, the oxide layer, the nitride layer, or the abnormal carburized layer due to the oxide layer or the nitride layer are hardly formed on the surface of the carburized layer. However, when Cu content is more than 0.50%, the ductility in a high temperature region of 1000° C. or higher decreases, which causes a decrease in yield of continuous casting and rolling. In addition, when Cu content is more than 0.50%, the hardness of the steel for carburizing before the forging increases, the deformation resistance increases, and the critical working ratio decreases. Therefore, it is preferable that Cu content is 0.005% to 0.50%. More preferably, it is 0.05% to 0.30%. In addition, in case of adding Cu, it is preferable that Ni content is more than half of Cu content by mass % in order to improve the ductility in the high temperature region.

In the selective elements, Ca, Mg, Te, Zr, REM, and Sb are effective in improving the machinability.

Ca: 0.0002% to 0.0030%

Ca (Calcium) is an element which has an effect of morphology control such that the shape of MnS which is formed by S added for the machinability improvement is controlled to be spheroidal without extending. By Ca addition, anisotropy of the shape of MnS is improved, and mechanical properties are not impaired. Moreover, Ca is element which improves the machinability by forming a protective film for a surface of a cutting tool during the cutting. To obtain the effects, it is preferable that Ca content is more than 0.0002%. When Ca content is more than 0.0030%, coarse oxides and sulfides may be formed, and the fatigue strength of the carburized steel component may be negatively influenced. Therefore, it is preferable that Ca content is 0.0002% to 0.0030%. More preferably, it is 0.0008% to 0.0020%.

Mg: 0.0002% to 0.0030%

Mg (Magnesium) is an element which controls the morphology of MnS and improves the machinability by forming the protective film for the surface of the cutting tool during the cutting. To obtain the effects, it is preferable that Mg content is more than 0.0002%. When Mg content is more than 0.0030%, coarse oxides may be formed, and the fatigue strength of the carburized steel component may be negatively influenced. Therefore, it is preferable that Mg content is 0.0002% to 0.0030%. More preferably, it is 0.0008% to 0.0020%.

Te: 0.0002% to 0.0030%

Te (tellurium) is an element which controls the morphology of MnS. To obtain the effect, it is preferable that Te content is more than 0.0002%. When Te content is more than 0.0030%, the steel excessively embrittles at high temperature. Therefore, it is preferable that Te content is 0.0002% to 0.0030%. More preferably, it is 0.0008% to 0.0020%.

Zr: 0.0002% to 0.0050%

Zr (Zirconium) is an element which controls the morphology of MnS. To obtain the effect, it is preferable that Zr content is more than 0.0002%. When Zr content is more than 0.0050%, coarse oxides may be formed, and the fatigue strength of the carburized steel component may be negatively influenced. Therefore, it is preferable that Zr content is 0.0002% to 0.0050%. More preferably, it is 0.0008% to 0.0030%.

Rare Earth Metal: 0.0002% to 0.0050%

REM (Rare Earth Metal) are elements which controls the morphology of MnS. To obtain the effect, it is preferable that REM content is more than 0.0002%. When REM content is more than 0.0050%, coarse oxides may be formed, and the fatigue strength of the carburized steel component may be negatively influenced. Therefore, it is preferable that REM content is 0.0002% to 0.0050%. More preferably, it is 0.0008% to 0.0030%.

Herein, REM indicate a generic name of a total of 17 elements in which scandium of the atomic number 21 and yttrium of the atomic number 39 are added to 15 elements from lanthanum of the atomic number 57 to lutetium of the atomic number 71. In general, misch metal which is a mixture of the elements is supplied and added to the steel.

Sb: 0.002% to 0.050%

Sb (antimony) is an element which prevents decarburization and carburization during the producing processes (the hot rolling, the hot forging, the annealing, and the like) of the steel for carburizing. To obtain the effect, it is preferable that Sb content is more than 0.002%. When Sb content is more than 0.050%, carburizing during the carburizing treatment may deteriorate. Therefore, it is preferable that Sb content is 0.002% to 0.050%. More preferably, it is 0.005% to 0.030%.

Next, the hardness parameter, the hardenability parameter, and the AlN precipitation parameter which needs to be satisfied simultaneously as the steel for carburizing and the steel portion of the carburized steel component according to the embodiment will be described.

Hardness Parameter

The amounts expressed in mass % of each element in the chemical composition needs to satisfy a following Equation A as the hardness parameter. Moreover, when Mo, Ni, and Cu which are selective elements are contained, the hardness parameter is redefined as a following Equation B on behalf of the Equation A.

$$0.10 < C + 0.194 \times Si + 0.065 \times Mn + 0.012 \times Cr + 0.078 \times Al < 0.235 \quad \text{(Equation A)}$$

$$0.10 < C + 0.194 \times Si + 0.065 \times Mn + 0.012 \times Cr + 0.033 \times Mo + 0.067 \times Ni + 0.097 \times Cu + 0.078 \times Al < 0.235 \quad \text{(Equation B)}$$

When C content is low, in the microstructure of the steel for carburizing before the forging, a ferrite fraction increases considerably as compared with the above-mentioned conventional steel for carburizing (C content is approximately 0.2%). In the case, the hardness of the steel for carburizing is greatly affected not only to C content (a pearlite fraction) but also to the hardness of the ferrite. Thus, the inventor estimated the contribution of each alloying element to the effect of the solute strengthening of the ferrite on the basis of data which are disclosed in General literatures (for example, F. B. Pickering: "Physical metallurgy and the design of steels" published by Maruzen in 1981, William C. Leslie: "The Physical Metallurgy of Steels" published by Maruzen in 1985, and the like). As a result, the inventor derived the original equations of the parameter as shown in the Equation A and the Equation B in consideration also of the influence of C content. Based on the equations of the hardness parameter of the steel for carburizing, the hardness of the steel for carburizing which had various chemical compositions was evaluated, and threshold value which could achieve the softening of the steel for carburizing certainly as compared with the conventional techniques was obtained. In other words, when the hardness parameter is 0.235 or more, the hardness of the steel for carburizing before the forging increases, the deformation resistance increases, and the critical working ratio decreases. As a result, predominance over the conventional materials becomes small. On the other hand, when the hardness parameter is 0.10 or less, the hardness as the carburized steel component is insufficient. Therefore, the hardness parameter needs to be more than 0.10 to less than 0.235. It is preferable that the hardness parameter is as low as possible within a range where the hardenability parameter as described below is satisfied. It is preferable to be more than 0.10 to less than 0.230. It is more preferable to be more than 0.10 to 0.220 or less. It is most preferable to be more than 0.10 to 0.210 or less.

Hardenability Parameter

The amounts expressed in mass % of each element in the chemical composition needs to satisfy a following Equation C as the hardenability parameter. Moreover, when Mo and Ni which are selective elements are contained, the hardenability parameter is redefined as a following Equation D on behalf of the Equation C.

$$7.5 < (0.7 \times Si+1) \times (5.1 \times Mn+1) \times (2.16 \times Cr+1) < 44 \quad \text{(Equation C)}$$

$$7.5 < (0.7 \times Si+1) \times (5.1 \times Mn+1) \times (2.16 \times Cr+1) \times (3 \times Mo+1) \times (0.3633 \times Ni+1) < 44 \quad \text{(Equation D)}$$

As described above, B addition is very effective in improving the hardenability of the steel portion of the carburized steel component. However, when gas carburizing is conducted by converted gas method, it is not expected to obtain the improvement effect of the hardenability by B addition in a carburized layer which is a surface layer of the carburized steel component. The reasons are that N penetrates from atmosphere into the surface layer of the carburized steel component during the carburizing treatment, the solid soluted B precipitates as BN, and the amount of the solid soluted B which contributes to the improvement of the hardenability becomes insufficient. Thus, in order to secure the hardenability in the carburized layer which is the surface layer of the carburized steel component, it is necessary to utilize the elements which enhance the hardenability of the steel except B. In regard to relationship between the hardenability and the alloying elements, various parameters are proposed. In an aspect of the present invention, the equations of the parameter which are described in the Patent Document 3 are employed. The reasons are that the steel which is described in the Patent Document 3 is the steel for carburizing even if C content is different, and the feature in which C content is low as compared with general steel for carburizing is common, between the steel for carburizing or the steel portion of the carburized steel component according to the embodiment and the steel which is described in the Patent Document 3. Based on the Equation C and the Equation D which were the hardenability parameter, the carburizing and quenching was conducted by using the steel for carburizing which had various chemical compositions, and threshold value which could achieve the hardness of the carburized layer and the effective case depth (depth where Vickers hardness is HV550 or more) that were equal to or higher than that of the above-mentioned conventional steel for carburizing (C content is approximately 0.20%) by the same carburizing heat treatment conditions was obtained. In other words, when the hardenability parameter is 7.5 or less, the properties which are equal to that of the conventional steel for carburizing (C content is approximately 0.20%) cannot be obtained. When the hardenability parameter is 44 or more, the hardness of the steel for carburizing before the forging increases, the deformation resistance increases, and the critical working ratio decreases. Therefore, the hardenability parameter needs to be more than 7.5 to less than 44. It is preferable that the hardenability parameter is as high as possible within a range where the hardness parameter as described above is satisfied. It is preferable to be 12.1 or more to less than 44. It is more preferable to be 20.1 or more to less than 44.

AlN Precipitation Parameter

The amounts expressed in mass % of Al, N, and Ti needs to satisfy a following Equation E as the AlN precipitation parameter.

$$0.0003 < Al \times (N - Ti \times (14/48)) < 0.0011 \quad \text{(Equation E)}$$

N which is contained in the steel forms preferentially TiN by bonding to Ti. Namely, "(N—Ti×(14/48))" in the Equation E indicates the state such that N in the steel exists by the morphology except TiN and, in other words, indicates N content which is possibly to form AlN. In the Equation E, "14" indicates the atomic weight of N, and "48" indicates the atomic weight of Ti.

When the AlN precipitation parameter is 0.0003 or less, the grain coarsening cannot be prevented during the carburizing, because the precipitation amount of AlN is insufficient. When the AlN precipitation parameter is 0.0011 or more, the precipitation amount of AlN increases excessively, and plastic deformability of the steel for carburizing and the carburized steel component deteriorates. Moreover, AlN precipitates do not disperse finely, each size grows, and the effect to prevent the grain coarsening is not obtained. Therefore, the AlN precipitation parameter needs to be more than 0.0003 to less than 0.0011. It is preferable to be 0.0005 or more to less than 0.0010.

By satisfying simultaneously the hardness parameter, the hardenability parameter, and the AlN precipitation parameter as described above, it is possible to provide the steel for carburizing and the carburized steel component, which have, in the state of the steel for carburizing, the small deformation resistance and the large critical working ratio at the cold forging as compared with the conventional steel for carburizing, and which have, after the carburizing heat treatment, the hardened layer and the hardness of the steel portion which are equivalent to the conventional steel.

Next, the metallographic structure of the steel for carburizing and the carburized steel component according to the embodiment will be described.

First, the metallographic structure of the steel for carburizing according to the embodiment will be described.

In the steel for carburizing which consists of the above-mentioned chemical composition, it is preferable that the metallographic structure includes, by area %, the ferrite and the pearlite of 85% to 100% in total.

When the ferrite and the pearlite of 85% to 100% are included in total, preferably, the hardness of the steel for carburizing decreases, the deformation resistance decreases, and the critical working ratio increases. It is more preferable that the ferrite and the pearlite are 95% to 100% in total. The balance of the ferrite and the pearlite includes bainite, martensite, cementites, and the like which are harder phase than the ferrite and the pearlite. To obtain the effect by the ferrite and the pearlite, it is preferable that a fraction of the bainite, the martensite, the cementites, and the like which are the balance is to be 0% to less than 15% in area %.

In order to obtain the metallographic structure, it is preferable to conduct a slow cooling process of slow-cooling by a cooling rate of more than 0° C./s to 1° C./s in a temperature range where a surface temperature of a hot worked steel material is 800° C. to 500° C. after a hot working process in producing the steel for carburizing. The method of producing the same is described later in detail.

Instead of the above-mentioned metallographic structure, the steel for carburizing which consists of the above-mentioned chemical composition may include, by area %, the ferrite and spheroidal cementites of 85% to 100% in total. Herein, cementites in which area fraction thereof is 54% or more as compared with that of a circle whose diameter is maximum diagonal line of the cementites on an observed section for the metallographic structure are defined as the spheroidal cementites.

When the ferrite and the spheroidal cementites of 85% to 100% are included in total, preferably, the hardness of the steel for carburizing decreases, the deformation resistance decreases, and the critical working ratio increases. It is more preferable that the ferrite and the spheroidal cementites are 90% to 100% in total. The balance of the ferrite and the spheroidal cementites includes the pearlite, the martensite, the bainite, tempered martensite, tempered bainite, the cementites, and the like. To obtain the effect by the ferrite and the spheroidal cementites, it is preferable that a fraction of the pearlite, the martensite, the bainite, the tempered martensite, the tempered bainite, the cementites, and the like which are the balance is to be 0% to less than 15% in area %.

In order to obtain the metallographic structure, it is preferable to further conduct a spheroidizing annealing process of spheroidizing-annealing the hot-worked steel material after the slow cooling process. The method of producing the same is described later in detail.

Instead of the above-mentioned metallographic structure, the steel for carburizing which consists of the above-mentioned chemical composition may have a following metallographic structure. When a shape of the steel for carburizing is a bar or a wire rod in which a cross section perpendicular to a longitudinal direction is round, and when a distance from a periphery to a center of the cross section is defined as r in unit of mm, in the metallographic structure of the surface layer which is a portion from the periphery to r×0.01, the ferrite and the pearlite may be limited, by area %, to 10% or less in total, and the balance may include at least one of the martensite, the bainite, the tempered martensite, the tempered bainite, and the cementites.

When the ferrite and the pearlite are limited, by area %, to 10% or less in total in the metallographic structure of the surface layer, the cementites after the spheroidizing annealing disperse uniformly, so that the critical working ratio at the cold forging increases. It is more preferable that the ferrite and the pearlite in the surface layer are 5% or more in total. The balance of the ferrite and the pearlite includes the martensite, the bainite, the tempered martensite, the tempered bainite, the cementites, and the like. In addition, when depth of the surface layer which has the metallographic structure is less than depth from the periphery to r×0.01, depth of the surface layer where the critical working ratio at the cold forging increases is insufficient, so that cracks are easy to be initiated during the cold forging. Thus, it is preferable that the portion at least from the periphery to r×0.01 has the metallographic structure. It is more preferable that the portion is from the periphery to the radius of the cross section×0.05. It is most preferable that the portion is from the periphery to the radius of the cross section×0.15. Moreover, even if the above-mentioned metallographic structure exists to the center of the cross section, there is no bad influence.

In order to obtain the metallographic structure, it is preferable to conduct a hot controlled rolling process of hot-rolling by controlling conditions so that a surface temperature at an exit side of a final finish rolling becomes 700° C. to 1000° C. to obtain a hot-controlled-rolled steel material, a rapid cooling process of rapid-cooling so that the surface temperature of the hot-controlled-rolled steel material is more than 0° C. to 500° C. after the hot controlled rolling process, and a self-reheating process of self-reheating the hot-controlled-rolled steel material after the rapid cooling process at least one time or more in producing the steel for carburizing. The method of producing the same is described later in detail.

Instead of the above-mentioned metallographic structure, in the cementites included in the metallographic structure of the surface layer of the steel for carburizing which consists of the above-mentioned chemical composition, the cementites of 90% to 100% may be cementites whose aspect ratio is 3 or less. Herein, a value which divides the major axis by the minor axis is defined as the aspect ratio. Or, spheroidicity may be within No. 2 specified in JIS G 3507-2.

When the cementites of 90% to 100% are the cementites whose aspect ratio is 3 or less in the cementites included in the metallographic structure of the surface layer, the critical working ratio at the cold forging increases further. It is more preferable that the percentage of the cementites whose aspect ratio is 3 or less is 95% to 100%.

In order to obtain the metallographic structure, it is preferable to further conduct a spheroidizing annealing process of spheroidizing-annealing the hot-controlled-rolled steel material after the self-reheating process. The method of producing the same is described later in detail.

Next, the metallographic structure of the carburized steel component according to the embodiment will be described.

The carburized steel component according to the embodiment includes the steel portion and the carburized layer with the effective case depth (depth where the Vickers hardness is HV550 or more) of a thickness of more than 0.4 mm to less than 2 mm which is formed on an outside of the steel portion. Herein, the carburized layer indicates the effective case depth where the Vickers hardness is HV550 or more. It is preferable that, in the carburized layer, the metallographic structure at a position of 50 μm in depth from the surface includes the martensite of 90% to 100% in area %, and the Vickers hardness at the position of 50 μm in depth from the surface is HV 650 to HV 1000. In addition, it is preferable that, in the carburized layer, the metallographic structure at a position of 0.4 mm in depth from the surface includes the martensite of 90% to 100% in area %, and the Vickers hardness at the position of 0.4 mm in depth from the surface is HV 550 to HV 900.

When the metallographic structure includes the martensite of 90% to 100% and the Vickers hardness is HV 650 to HV 1000 in the carburized layer at the position of 50 μm in depth from the surface, wear resistance, surface fatigue strength, bending fatigue strength (mainly high cycle), and torsional fatigue strength are preferably equal to or higher than that of the above-mentioned conventional carburized steel component. It is more preferable that the metallographic structure includes the martensite of 95% to 100% and the Vickers hardness is HV 700 to HV 1000.

When the metallographic structure includes the martensite of 90% to 100% and the Vickers hardness is HV 550 to HV 900 in the carburized layer at the position of 0.4 mm in depth from the surface, the surface fatigue strength, the bending fatigue strength (mainly low cycle), and the torsional fatigue strength are preferably equal to or higher than that of the above-mentioned conventional carburized steel component. It is more preferable that the metallographic structure includes the martensite of 92% to 100% and the Vickers hardness is HV 560 to HV 900.

In addition, it is preferable that, in the steel portion, the Vickers hardness at a position of 2 mm in depth from the surface is HV 250 to HV 500. Moreover, in the steel portion, a chemical composition at the position of 2 mm in depth from the surface needs to consist of the above-mentioned chemical composition.

When the Vickers hardness is HV 250 to HV 500 in the steel portion at the position of 2 mm in depth from the surface, the hardness of the steel portion is preferably equal to or higher than that of the above-mentioned conventional carburized steel component, even if C content is low. It is more preferable that the Vickers hardness is HV 270 to HV 450. When the metallographic structure includes at least one of the martensite and the bainite in the steel portion at the position of 2 mm in depth from the surface, the above-mentioned effect is preferably obtained.

In order to obtain the metallographic structure and the Vickers hardness of the carburized steel component, the carburized steel component may be produced by using the steel for carburizing which consists of the above-mentioned chemical composition and by the method of producing the steel for carburizing and the carburized steel component as described later.

The metallographic structure can be observed by an optical microscope after nital etching or picral etching is conducted. At the time, it is preferable to conduct the picral etching for specimens after the spheroidizing annealing. The fraction of the ferrite, the pearlite, the bainite, the martensite, the tempered martensite, the tempered bainite, the cementites, and the like can be determined by an image analysis. Moreover, the spheroidal cementites, the number of the cementites, and the aspect ratio can be determined by the image analysis. Although the observed section is not limited particularly, the observed section may be the cross section perpendicular to the longitudinal direction.

In addition, the ferrite, the pearlite, the martensite, the bainite, the tempered martensite, the tempered bainite, the spheroidal cementites, and the cementites are taken into consideration for the determination of the fraction of metallographic structure. Nitrides or carbides such as BN, TiC, TiN, and AlN, other fine precipitates, residual austenite and the like are not taken into consideration for the determination of the fraction.

It is preferable that the Vickers hardness is measured ten times in total per one specimen and the average value is calculated. Although a measured section is not limited particularly, the measured section may be the cross section perpendicular to the longitudinal direction.

Next, the method of producing the steel for carburizing and the carburized steel component according to the embodiment will be described.

First, the method of producing the steel for carburizing according to the embodiment will be described.

In a casting process, molten steel which consists of the base elements, the selective elements, and the unavoidable impurities as described above is casted to obtain a bloom. Although a casting method is not limited particularly, a vacuum casting method, a continuous casting method, and the like may be employed.

In addition, according to the necessity, a soaking, a blooming, and the like may be conducted by using the bloom after the casting process.

The steel for carburizing which has the above-mentioned metallographic structure can be produced by using the bloom and by selecting any method of producing the same as described below.

In order to produce the steel for carburizing with the metallographic structure which includes, by area %, the ferrite and the pearlite of 85% to 100% in total, it is preferable to conduct the following producing method.

In the hot working process, the bloom after the casting process is hot-worked to obtain the hot worked steel material, which is the hot rolling, the hot forging, and the like. Although deformation processing conditions such as working temperature, working ratio, strain rate, and the like are not limited particularly in the hot working process, appropriate conditions may be employed.

In the slow cooling process, the hot worked steel material which is still not cooled just after the hot working process is slow-cooled to obtain the steel for carburizing by the cooling rate of more than 0° C./s to 1° C./s in the temperature range where the surface temperature of the hot worked steel material is 800° C. to 500° C.

When the cooling rate in the temperature range of 800° C. to 500° C. where the austenite is transformed to the ferrite and the pearlite is more than 1° C./s, the fraction of the bainite and the martensite become excessive. As a result, the hardness of the steel for carburizing increases, the deformation resistance increases, and the critical working ratio decreases. Thus, it is preferable that the cooling rate in the temperature range is limited to more than 0° C./s to 1° C./s. More preferably, it is more than 0° C./s to 0.7° C./s. In the slow cooling process, in order to decrease the cooling rate of the hot worked steel material after the hot working process, an insulating cover, an insulating cover with heater, a retention furnace, and the like may be equipped after a rolling line or a hot-forging line.

In order to produce the steel for carburizing with the metallographic structure which includes, by area %, the ferrite and the spheroidal cementites of 85% to 100% in total, it is preferable to conduct the following producing method.

In the spheroidizing annealing process, the hot worked steel material after the slow cooling process may be additionally spheroidizing-annealed to obtain the steel for carburizing.

For the spheroidizing annealing, for example, the following heat treating may be conducted. The hot worked steel material after the slow cooling process is heated to a temperature just above or just below Ac1 point (a temperature at which the austenite begins to form during heating) and is cooled slowly. Or, the hot worked steel material after the slow cooling process is heated to a temperature just above Ac1 point and is cooled to a temperature just below Ar1 point (a temperature at which the austenite completes the transformation to the ferrite or the ferrite and cementites during cooling), and the treatment of the heating and the cooling repeats several times. Or, the hot worked steel material after the slow cooling process is quenched once and thereafter is tempered for 3 hours to 100 hours in a temperature range of 600° C. to 700° C. Although the spheroidizing annealing method is not limited particularly, conventional annealing and conventional spheroidizing heat treatment may be employed as described above.

The hardness of the steel for carburizing after the spheroidizing annealing process can further decrease as compared with the steel for carburizing without the spheroidizing annealing process. The reasons are that cementites with lamellae shape in the pearlite structure which is included in the metallographic structure before the spheroidizing annealing process are divided, are spheroidized, and are grown by the spheroidizing annealing process, and the hardness in area which was pearlite structure decreases. Moreover, the harder phases such as the bainite, the martensite, and the like which are included in the metallographic structure before the spheroidizing annealing process soften by dislocation recovery, precipitation and growth of the cementites, and the like by the spheroidizing annealing process. Thus, it is preferable to conduct the spheroidizing annealing process in order further to decrease the hardness of the steel for carburizing, to decrease the deformation resistance, and to increase the critical working ratio.

In order to produce the steel for carburizing whose shape is the bar and the wire rod in which the cross section perpendicular to the longitudinal direction is round, and whose metallographic structure includes the ferrite and the pearlite which are limited, by area %, to 10% or less in total and the balance which includes at least one of the martensite, the bainite, the tempered martensite, the tempered bainite, and the cementites in the surface layer which is the portion from the periphery to r×0.01, it is preferable to conduct the following producing method.

In the hot controlled rolling process, the bloom after the casting process is hot-rolled to obtain the hot-controlled-rolled steel material by controlling conditions so that the surface temperature at the exit side of the final finish rolling becomes 700° C. to 1000° C.

In the rapid cooling process, the hot-controlled-rolled steel material which is still not cooled just after the final finish rolling of the hot controlled rolling process is rapid-cooled so that the surface temperature of the hot-controlled-rolled steel material is more than 0° C. to 500° C.

In the self-reheating process, the hot-controlled-rolled steel material after the rapid cooling process is self-reheated at least one time or more to obtain the steel for carburizing.

In the hot controlled rolling process, in order to refine the grains, the surface temperature of the hot-controlled-rolled steel material is controlled to 700° C. to 1000° C. at the exit side of the final finish rolling. When the surface temperature is more than 1000° C., grain size becomes coarse as same as conventional hot rolled steel materials. When the surface temperature is less than 700° C., it is difficult to obtain the metallographic structure with small fraction of the ferrite in the surface layer. Thus, it is preferable that the surface temperature of the hot-controlled-rolled steel material at the exit side of the final finish rolling is the temperature range of 700° C. to 1000° C.

In the rapid cooling process, in order to obtain the metallographic structure with small fraction of the ferrite in the surface layer which is the portion from the periphery to r×0.01 by promoting the martensitic transformation or the bainitic transformation, the hot-controlled-rolled steel material is rapid-cooled so that the surface temperature is more than 0° C. to 500° C. In other words, it is preferable that the surface temperature of the hot-controlled-rolled steel material is rapid-cooled to the temperature range of more than 0° C. to 500° C. which is below the transformation start temperature such as Ms point (a temperature at which the austenite begins to be transformed to the martensite during cooling) or Bs point (a temperature at which the austenite begins to be transformed to the bainite during cooling) in the rapid cooling process. More preferably, it is more than 0° C. to 450° C.

In the self-reheating process, in order to perform the microstructure control such that the martensite or the bainite is transformed to the tempered martensite or the tempered bainite in the surface layer, the hot-controlled-rolled steel material after the rapid cooling process is self-reheated at least one time or more. By tempering the martensite or the bainite, incidence of quenching crack and season cracking is reduced. For the self-reheating method, the tempered martensite or the tempered bainite may be intentionally formed by equipping a production facility with a heating part to reheat. Or, the tempered martensite or the tempered bainite may be formed by raising again the temperature of the surface layer by the self-reheating which is derived from the heat of a central portion of the hot-controlled-rolled steel material after the rapid cooling process where the quenching effect is not influenced. It is possible to obtain the same effect even if either method as mentioned above is employed. However, in order to conduct the self-reheating process several times, the heating part is necessary for the self-reheating. Moreover, it is preferable that the temperature of the surface layer does not exceed 800° C. during the self-reheating. When the temperature of the surface layer is more than 800° C., the tempered martensite or the tempered bainite is transformed to the austenite again. More preferably, it is 720° C. or less. Moreover, it is preferable that the temperature of the surface layer becomes 400° C. or more during the self-reheating.

In order to produce the steel for carburizing such that the cementites of 90% to 100% are the cementites whose aspect ratio is 3 or less in the cementites included in the metallographic structure of the surface layer, it is preferable to conduct the following producing method.

In the spheroidizing annealing process, the hot-controlled-rolled steel material after the self-reheating process may be additionally spheroidizing-annealed to obtain the steel for carburizing. Although the spheroidizing annealing method is not limited particularly, the conventional annealing and the conventional spheroidizing heat treatment may be employed as described above.

By performing the spheroidizing annealing for the low-temperature-transformed microstructure such as the martensite and the bainite or the microstructure tempered from the low-temperature-transformed microstructure such as the tempered martensite and the tempered bainite, it is possible to obtain the metallographic structure such that the ferrite grains in matrix are fine and the spheroidal cementites disperse uniformly and finely in the matrix. When, in the cementites included in the metallographic structure of the surface layer, the cementites of 90% to 100% are the cementites whose aspect ratio is 3 or less, the critical working ratio at the cold forging further increases.

Next, the method of producing the carburized steel component according to the embodiment will be described.

In a cold working process, the steel for carburizing, which consists of the base elements, the selective elements, and the unavoidable impurities and which is produced through the process selected from the slow cooling process, the self-reheating process, and the spheroidizing annealing process, is cold-worked in order to give a shape. Although deformation processing conditions such as working ratio, strain rate, and the like are not limited particularly in the cold working process, appropriate conditions may be employed.

In a carburizing process, the steel for carburizing after the cold working process which was given the shape is carburized or is carbonitrized. In order to obtain the carburized steel component which has the metallographic structure and the hardness as mentioned above, it is preferable that, as conditions for the carburizing or the carbonitriding, temperature is controlled to 830° C. to 1100° C., carbon potential is controlled to 0.5% to 1.2%, and carburizing time is controlled to 1 hour or more.

In a finish heat treatment process after the carburizing process, the quenching or the quenching and tempering is conducted to obtain the carburized steel component. In order to obtain the carburized steel component which has the metallographic structure and the hardness as mentioned above, it is preferable that, as conditions for the quenching or the quenching and tempering, temperature of quenching medium is controlled to the room temperature to 250° C.

Moreover, according to the necessity, subzero treatment may be conducted after the quenching.

In addition, according to the necessity, the steel for carburizing before the cold working process may be additionally annealed as a annealing process. By the annealing, the hardness of the steel for carburizing decreases, the deformation resistance decreases, and the critical working ratio increases. Although annealing conditions are not limited particularly, appropriate conditions may be employed.

In addition, according to the necessity, the steel for carburizing after the cold working process and before the carburizing process may be additionally cut to give a shape as a cutting process. By the cutting, it is possible to give the steel for carburizing a precise shape difficult to be formed by only the cold-working.

In addition, according to the necessity, the steel for carburizing after the finish heat treatment process may be additionally shot-peened as a shot-peening process. By the shot-peening, compressive residual stress is induced to the surface layer of the carburized steel component. Since the compressive residual stress suppresses initiation and propagation of fatigue cracks, it is possible to further improve the tooth root and tooth surface fatigue strength of the carburized steel component. For the shot-peening, it is preferable that shot peening media of 0.7 mm or less in diameter are employed and arc height is 0.4 mm or more as conditions.

EXAMPLE

Hereinafter, the effects of an aspect of the present invention will be described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

Experiment 1

As the casting process, molten steel made by the converter having the chemical composition as shown in Table 1 was casted by the continuous casting to obtain a bloom. The bloom was subjected to the soaking and the blooming to obtain a bloom with a shape of 162 mm square. As the hot working process, the bloom was hot-worked to obtain a hot worked steel material with the bar shape in which the cross section perpendicular to the longitudinal direction was round and the diameter of the cross section was 35 mm. As the slow cooling process, the hot worked steel material was slow-cooled by the cooling rate as shown in Table 2 with the insulating cover or the insulating cover with heater which were equipped after the rolling line to obtain the steel for carburizing. Thereafter, as the spheroidizing annealing process (SA process: Spheroidizing Annealing), the spheroidizing annealing was conducted.

Various properties of the steel for carburizing which was produced as described above were evaluated. Specimens for the hardness measurement and the metallographic structure observation were sampled at the position which was ¼ in depth of the diameter of the cross section from the periphery of the steel for carburizing with the bar shape. In addition, Specimens (6 mm in diameter×9 mm, notch configuration: 30 degree, depth: 0.8 mm, radius of curvature at tip portion: 0.15 mm) for the measurement of the critical working ratio were sampled so that the longitudinal direction of the steel for carburizing became the compression direction. Measurement results of the hardness, the metallographic structure, and the critical working ratio of the steel for carburizing after the slow cooling process and after the spheroidizing annealing process (SA process) are shown in Table 2.

The hardness was measured ten times in total by using the Vickers hardness tester, and the average value was calculated. When the hardness of the steel for carburizing after the slow cooling process was HV 125 or less, and when the hardness of the steel for carburizing after the spheroidizing annealing process was HV 110 or less, the softening was sufficient and it was judged to be acceptable.

The metallographic structure was observed by the optical microscope after the steel for carburizing after the slow cooling process was nital-etched and the steel for carburizing after the spheroidizing annealing process was picral-etched. Total fraction of the ferrite and the pearlite and total fraction of the ferrite and the spheroidal cementites were determined by the image analysis. In addition, the balance except the above in the metallographic structure was the pearlite, the martensite, the bainite, the tempered martensite, the tempered bainite, the cementites, or the like.

The critical working ratio was measured by the conditions such that the cold compression was conducted by the rate of 10 mm/min by using the restricted die and the compression was stopped when the microcracking of 0.5 mm or more was initiated at the vicinity of the notch, and the working ratio at the time was calculated. The measurement was conducted ten times in total, the compression ratio in which the cumulative failure probability became 50% was measured, and the compression ratio was regarded as the critical working ratio. The critical working ratio of the conventional steel for carburizing was approximately 65%. Therefore, when the critical working ratio was 68% or more which was clearly higher than the conventional value, it was judged to be excellent in the critical working ratio.

In addition, the carburizing property was evaluated by the following method. Specimens (20 mm in diameter×30 mm) for the carburizing were sampled at the position which was ¼ in depth of the diameter of the cross section from the periphery of the steel for carburizing which was produced by the above-mentioned method, so that the longitudinal direction became the compression direction. As the cold working process, the cold upset compression with the compression ratio of 50% was conducted by using the specimens for the carburizing. The conditions for the upset compression were at the room temperature, using the restricted die, and by the strain rate of 1/sec. As the carburizing process, the specimens for the carburizing after the upset compression were carburized by the converted gas method. The gas carburizing was conducted by the conditions such that the carbon potential was 0.8%, the holding was for 5 hours at 950° C., and the subsequent holding was for 0.5 hours at 850° C. As the finish heat treatment process after the carburizing process, the oil quenching was conducted to 130° C. and the tempering was conducted for 90 minutes at 150° C. to obtain the carburized steel component.

Properties of the carburized layer and the steel portion of the carburized steel component which was produced as described above were evaluated. Measurement results are shown in Table 2.

For the carburized layer of the carburized steel component, the hardness at the position of 50 μm in depth from the surface and the hardness at the position of 0.4 mm in depth from the surface were measured ten times in total by using the Vickers hardness tester, and the average values were calculated. When the hardness at the position of 50 µm in depth from the surface was HV 650 to HV 1000, and when the hardness at the position of 0.4 mm in depth from the surface was HV 550 to HV 900, the hardness was sufficient and it was judged to be acceptable.

For the carburized layer of the carburized steel component, the metallographic structure at the position of 0.4 mm in depth from the surface was evaluated. The metallographic structure was observed by the optical microscope after the nital etching. The fraction of the martensite was determined by the image analysis. In addition, the balance except the above in the metallographic structure was the ferrite, the pearlite, the bainite, the tempered martensite, the tempered bainite, the spheroidal cementites, the cementites, or the like.

For the steel portion of the carburized steel component, the hardness and the chemical composition at the position of 2 mm in depth from the surface were evaluated. The hardness was measured ten times in total by using the Vickers hardness tester, and the average value was calculated. When the hardness was HV 250 to HV 500, the hardness was sufficient and it was judged to be acceptable. The chemical composition was measured by the quantitative analysis of the elements of atomic number 5 or more by using EPMA (Electron Probe Micro Analyser). When the chemical composition was the almost same as the chemical composition of the bloom which was the starting material, it was judged to be equivalent.

For the steel portion of the carburized steel component, the prior austenite grains at the position of 2 mm in depth from the surface were observed. In respect to the existence of the grain coarsening of the prior austenite, when at least one grain with the diameter of 100 µm or more existed in the observed section, it was judged to be "coarse grain". Or, when at least one grain with JIS grain size number of No. 4 or less existed, it might be judged to be "coarse grain".

As shown in Tables 1 and 2, in regard to the examples 1 to 16, all of the chemical composition, the hardness parameter, the hardenability parameter, and the AlN precipitation parameter achieved the target, so that the properties which were required as the steel for carburizing and the carburized steel components were satisfied.

On the other hand, in regard to the comparative examples 17 to 28, any of the chemical composition, the hardness parameter, the hardenability parameter, and the AlN precipitation parameter did not achieve the target, so that the properties which were required as the steel for carburizing and the carburized steel components were not satisfied.

In regard to the comparative examples Nos. 17 and 18, since C content, Al content, B content, and N content of the chemical composition and the hardness parameter were out of the range of the present invention, the hardness and the critical working ratio of the steel for carburizing were unacceptable.

In regard to the comparative example No. 19, since the hardness parameter was out of the range of the present invention, the hardness and the critical working ratio of the steel for carburizing were unacceptable.

In regard to the comparative examples Nos. 20 and 21, since the hardenability parameter was out of the range of the present invention, the hardness of the steel portion of the carburized steel component was unacceptable.

In regard to the comparative example No. 22, since B content of the chemical composition was out of the range of the present invention, the hardness of the steel portion of the carburized steel component was unacceptable.

In regard to the comparative example No. 23, since C content of the chemical composition and the hardness parameter were out of the range of the present invention, the hardness and the critical working ratio of the steel for carburizing were unacceptable.

In regard to the comparative example No. 24, since C content of the chemical composition was out of the range of the present invention, the hardness of the steel portion of the carburized steel component was unacceptable.

In regard to the comparative example No. 25, since Al content and N content of the chemical composition and the AlN precipitation parameter were out of the range of the present invention, the critical working ratio of the steel for carburizing and the hardness of the steel portion of the carburized steel component were unacceptable. Specifically, since N content was excessive so that coarse TiN was formed and acted as the fracture origin during the cold working, the critical working ratio of the steel for carburizing was unacceptable. Since AlN precipitation parameter was insufficient so that the improvement effect of the hardenability by B addition was not obtained, and since the pinning effect of the austenite grain by AlN during the carburizing was insufficient so that the grain coarsening occurred, the hardness of the steel portion of the carburized steel component was unacceptable.

In regard to the comparative example No. 26, since Al content of the chemical composition was more than the range of the present invention, the hardness and the critical working ratio of the steel for carburizing were unacceptable.

In regard to the comparative examples No. 27, since N content of the chemical composition and the AlN precipitation parameter were out of the range of the present invention, the hardness of the steel portion of the carburized steel component was unacceptable. This resulted from that the improvement effect of the hardenability by B addition was not obtained, and that the pinning effect of the austenite grain by AlN during the carburizing was insufficient so that the grain coarsening occurred.

In regard to the comparative examples No. 28, the AlN precipitation parameter was more than the range of the present invention, the hardness of the steel portion of the carburized steel component was unacceptable.

Experiment 2

As the casting process, molten steel made by the converter having the chemical composition of steel No. B as shown in Table 1 was casted by the continuous casting to obtain a bloom. The bloom was subjected to the soaking and the blooming to obtain a bloom with a shape of 162 mm square. As the hot controlled rolling process, the hot controlled rolling was conducted by controlling the finish temperature as shown in Table 3 by using the bloom to obtain a hot-controlled-rolled steel material with the bar shape in which the cross section perpendicular to the longitudinal direction was round and the diameter of the cross section was 35 mm. As the rapid cooling process, the hot-controlled-rolled steel material was rapid-cooled so that temperature of the surface layer became that as shown in Table 3 by using the water cooler which was equipped after the rolling line. Thereafter, as the self-reheating process, by raising again the temperature of the surface layer by the self-reheating which was derived from the heat of the central portion where the quenching effect was not influenced, the steel for carburizing was obtained. In addition, as the spheroidizing annealing process (SA process), the spheroidizing annealing was conducted.

Various properties of the steel for carburizing which was produced as described above were evaluated. Specimens for the hardness measurement were sampled at the position which was ¼ in depth of the diameter of the cross section from the periphery of the steel for carburizing with the bar shape. Specimens for the metallographic structure observation were sampled at the position which was r×0.01 in depth from the periphery. In addition, Specimens (6 mm in diameter×9 mm, notch configuration: 30 degree, depth: 0.8 mm, radius of curvature at tip portion: 0.15 mm) for the measurement of the critical working ratio were sampled so that the longitudinal direction of the steel for carburizing became the compression direction. Measurement results of the hardness, the metallographic structure, and the critical working ratio of the steel for carburizing after the self-reheating process and after the spheroidizing annealing process (SA process) are shown in Table 3.

The measuring method and the criterion of the hardness were the same as the experiment 1. The measuring method and the criterion of the critical working ratio were also the same as the experiment 1.

The metallographic structure was observed by the optical microscope after the steel for carburizing after the self-reheating process was nital-etched and the steel for carburizing after the spheroidizing annealing process was picral-etched. Total fraction of the ferrite and the pearlite, the number of the cementites, and the aspect ratio were determined by the image analysis. In addition, the balance except the above in the metallographic structure was the martensite, the bainite, the tempered martensite, the tempered bainite, the spheroidal cementites, the cementites, or the like.

Also the carburizing property was evaluated. The carburizing method, the evaluating method, and the criterion were the same as the experiment 1.

As shown in Tables 1 and 3, in the examples 29 to 36, all of the chemical composition, the hardness parameter, the hardenability parameter, and the AlN precipitation parameter achieved the target, so that the properties which were required as the steel for carburizing and the carburized steel components were satisfied.

[Table 1]
[Table 2]
[Table 3]

INDUSTRIAL APPLICABILITY

According to the above aspects of the present invention in regard to the steel for the carburizing, the carburized steel component, and the method of producing the same, it is possible to provide a steel for carburizing, a carburized steel component, and a method of producing the same, which have, in the state of the steel for carburizing, small deformation resistance and large critical working ratio at a cold forging as compared with the conventional steel for carburizing, and which have, after a carburizing heat treatment, a hardened layer and hardness of steel portion which are equivalent to a conventional steel. Accordingly, the present invention has significant industrial applicability.

TABLE 1

| | Steel No. | Chemical Composition (mass %) | | | | | | | | | | | | |
|---|---|---|---|---|---|---|---|---|---|---|---|---|---|---|
| | | C | Si | Mn | P | S | Cr | Mo | Ni | Cu | V | Ti | Nb | Al |
| Example | A | 0.10 | 0.01 | 0.30 | 0.015 | 0.005 | 1.80 | | | | | | | 0.110 |
| | B | 0.10 | 0.05 | 0.50 | 0.015 | 0.005 | 1.80 | | | | | | | 0.110 |
| | C | 0.10 | 0.25 | 0.50 | 0.015 | 0.015 | 1.80 | | | | | | | 0.110 |
| | D | 0.10 | 0.05 | 0.50 | 0.015 | 0.005 | 5.00 | | | | 0.002 | | | 0.110 |
| | E | 0.10 | 0.47 | 0.0001 | 0.015 | 0.005 | 2.20 | | | | | 0.019 | | 0.110 |
| | F | 0.10 | 0.01 | 0.80 | 0.015 | 0.005 | 1.51 | 0.005 | 0.005 | 0.005 | | | | 0.110 |
| | G | 0.10 | 0.01 | 0.20 | 0.015 | 0.005 | 1.55 | | | | 0.20 | | | 0.110 |
| | H | 0.10 | 0.37 | 0.50 | 0.015 | 0.005 | 1.80 | | | | | | | 0.110 |
| | I | 0.10 | 0.0001 | 0.20 | 0.015 | 0.005 | 2.00 | | | | | | 0.0040 | 0.200 |
| | J | 0.10 | 0.25 | 0.50 | 0.015 | 0.015 | 1.60 | | | | | | | 0.070 |
| | K | 0.10 | 0.05 | 0.60 | 0.015 | 0.005 | 1.80 | | | | | | 0.0040 | 0.115 |
| | L | 0.10 | 0.25 | 0.50 | 0.015 | 0.005 | 1.70 | | | | | | | 0.105 |
| | M | 0.10 | 0.01 | 0.35 | 0.015 | 0.005 | 1.55 | 0.50 | | | | | 0.0010 | 0.200 |
| | N | 0.07 | 0.01 | 0.20 | 0.015 | 0.005 | 1.60 | | 1.00 | 0.50 | | | 0.1000 | 0.080 |
| | O | 0.13 | 0.05 | 0.50 | 0.015 | 0.005 | 1.80 | | | | | 0.010 | | 0.110 |
| Comparative Example | P | <u>0.20</u> | 0.25 | 0.80 | 0.015 | 0.015 | 1.20 | | | | | | | <u>0.035</u> |
| | Q | 0.12 | 0.30 | 0.80 | 0.015 | 0.015 | 1.80 | | | | | | | 0.110 |
| | R | 0.10 | 0.05 | 0.10 | 0.015 | 0.015 | 1.55 | | | | | | | 0.110 |
| | S | 0.10 | 0.05 | 0.15 | 0.015 | 0.015 | 1.35 | | | | | | | 0.110 |
| | T | 0.10 | 0.05 | 0.50 | 0.015 | 0.005 | 1.80 | | | | | | | 0.110 |
| | U | <u>0.18</u> | 0.05 | 0.50 | 0.015 | 0.005 | 1.80 | | | | | | | 0.110 |
| | V | <u>0.04</u> | 0.05 | 0.50 | 0.015 | 0.005 | 1.80 | | | | | | | 0.110 |
| | W | 0.10 | 0.05 | 0.50 | 0.015 | 0.005 | 1.80 | | | | | 0.010 | 0.0020 | <u>0.025</u> |
| | X | 0.10 | 0.05 | 0.50 | 0.015 | 0.005 | 1.80 | | | | | | | <u>0.340</u> |
| | Y | 0.10 | 0.05 | 0.50 | 0.015 | 0.005 | 1.80 | | | | | | 0.0020 | 0.100 |
| | Z | 0.10 | 0.05 | 0.50 | 0.015 | 0.005 | 1.80 | | | | | | | 0.150 |

| | Steel No. | Chemical Composition (mass %) | | | | | | | | | Hardness Parameter | Hardenability Parameter | AlN Precipitation Parameter |
|---|---|---|---|---|---|---|---|---|---|---|---|---|---|
| | | B | Ca | Mg | Te | Zr | REM | Sb | N | O | | | |
| Example | A | 0.0020 | 0.0002 | | | | | | 0.0080 | 0.0016 | 0.152 | 12.5 | 0.0009 |
| | B | 0.0020 | | 0.0013 | | | | | 0.0080 | 0.0018 | 0.172 | 18.0 | 0.0009 |
| | C | 0.0020 | 0.0012 | | | 0.0011 | | | 0.0080 | 0.0008 | 0.211 | 20.4 | 0.0009 |
| | D | 0.0020 | | | | | | | 0.0080 | 0.0010 | 0.211 | 43.4 | 0.0009 |
| | E | 0.0020 | | | | | | 0.0020 | 0.0100 | 0.0011 | 0.226 | 7.6 | 0.0005 |
| | F | 0.0020 | | | | | | | 0.0080 | 0.0030 | 0.182 | 22.2 | 0.0009 |
| | G | 0.0020 | | | | | | | 0.0080 | 0.0007 | 0.142 | 8.8 | 0.0009 |

TABLE 1-continued

|  |  | C1 | C2 | C3 | C4 | C5 | C6 | C7 | C8 | C9 |
|---|---|---|---|---|---|---|---|---|---|---|
|  | H | 0.0020 |  |  |  | 0.0080 | 0.0022 | 0.234 | 21.8 | 0.0009 |
|  | I | 0.0020 |  |  |  | 0.0030 | 0.0001 | 0.153 | 10.7 | 0.0006 |
|  | J | 0.0020 |  |  |  | 0.0100 | 0.0015 | 0.206 | 18.6 | 0.0007 |
|  | K | 0.0020 |  |  |  | 0.0040 | 0.0023 | 0.179 | 20.5 | 0.0005 |
|  | L | 0.0020 |  |  |  | 0.0085 | 0.0019 | 0.210 | 19.5 | 0.0009 |
|  | M | 0.0020 | 0.0030 | 0.0015 |  | 0.0048 | 0.0026 | 0.175 | 30.5 | 0.0010 |
|  | N | 0.0020 |  |  | 0.0010 | 0.0035 | 0.0010 | 0.226 | 12.4 | 0.0003 |
|  | O | 0.0020 |  |  |  | 0.0100 | 0.0010 | 0.202 | 18.0 | 0.0008 |
| Comparative Example | P |  |  |  |  | <u>0.0130</u> | 0.0016 | <u>0.318</u> | 21.4 | 0.0005 |
|  | Q | 0.0020 |  |  |  | 0.0080 | 0.0013 | <u>0.260</u> | 30.0 | 0.0009 |
|  | R | 0.0020 |  |  |  | 0.0080 | 0.0018 | 0.143 | <u>6.8</u> | 0.0009 |
|  | S | 0.0020 |  |  |  | 0.0080 | 0.0009 | 0.144 | <u>7.2</u> | 0.0009 |
|  | T |  |  |  |  | 0.0080 | 0.0008 | 0.172 | 18.0 | 0.0009 |
|  | U | 0.0020 |  |  |  | 0.0080 | 0.0010 | <u>0.252</u> | 18.0 | 0.0009 |
|  | V | 0.0020 |  |  |  | 0.0080 | 0.0011 | 0.112 | 18.0 | 0.0009 |
|  | W | 0.0020 |  |  |  | <u>0.0150</u> | 0.0010 | 0.166 | 18.0 | <u>0.0003</u> |
|  | X | 0.0020 |  |  |  | 0.0030 | 0.0008 | 0.190 | 18.0 | 0.0010 |
|  | Y | 0.0020 |  |  |  | <u>0.0015</u> | 0.0009 | 0.172 | 18.0 | <u>0.0002</u> |
|  | Z | 0.0020 |  |  |  | 0.0090 | 0.0021 | 0.176 | 18.0 | <u>0.0014</u> |

※Blank in the table means unadded.
※The underlined value in the table means out of the range of the present invention.

TABLE 2

| | | | Steel for Carburizing | | | | | | | Carburized Steel Component | | | | | |
|---|---|---|---|---|---|---|---|---|---|---|---|---|---|---|---|
| | | Production Result | Evaluation Result | | | | | | | Evaluation Result | | | | | |
| | | Cooling | Microstructure | | Hardness | | Critical Working Ratio | | | Carburized Layer | | | Martensite | Steel Portion | |
| Production No. | Steel No. | Rate from 800° C. to 500° C. at Slow Cooling Process (° C./s) | Total Fraction Ferrite and Pearlite after Slow Cooling Process (%) | Total Fraction Ferrite and Spheroida Cementites after SA Process (%) | after Slow Cooling Process (HV) | after SA Process (HV) | after Slow Cooling Process (%) | after SA Process (%) | Hardness at 50 μm in depth (HV) | Hardness at 0.4 mm in depth (HV) | Fraction at 0.4 mm in depth (%) | Hardness at 2 mm in depth (HV) | Chemical Composition at 2 mm in depth | Grain Growth at Carburizing |
| Example | | | | | | | | | | | | | | | |
| 1 | A | 0.44 | 100 | 100 | 104 | 98 | 69 | 70 | 793 | 748 | 97 | 319 | equivalent | none |
| 2 | B | 0.42 | 100 | 100 | 102 | 96 | 70 | 71 | 825 | 765 | 96 | 312 | equivalent | none |
| 3 | C | 0.39 | 100 | 100 | 119 | 105 | 69 | 70 | 872 | 770 | 100 | 298 | equivalent | none |
| 4 | D | 0.43 | 92 | 91 | 123 | 108 | 68 | 69 | 805 | 770 | 100 | 291 | equivalent | none |
| 5 | E | 1.00 | 100 | 100 | 123 | 106 | 68 | 69 | 850 | 731 | 91 | 315 | equivalent | none |
| 6 | F | 0.46 | 100 | 100 | 110 | 102 | 68 | 69 | 871 | 775 | 100 | 309 | equivalent | none |
| 7 | G | 0.70 | 100 | 100 | 94 | 94 | 70 | 71 | 864 | 738 | 94 | 308 | equivalent | none |
| 8 | H | 0.39 | 100 | 100 | 117 | 106 | 68 | 69 | 762 | 792 | 100 | 291 | equivalent | none |
| 9 | I | 0.49 | 100 | 100 | 117 | 104 | 68 | 69 | 850 | 745 | 97 | 310 | equivalent | none |
| 10 | J | 0.40 | 100 | 100 | 120 | 106 | 68 | 69 | 763 | 768 | 98 | 292 | equivalent | none |
| 11 | K | 0.50 | 100 | 100 | 116 | 105 | 69 | 70 | 808 | 773 | 100 | 319 | equivalent | none |
| 12 | L | 0.34 | 100 | 100 | 119 | 106 | 68 | 69 | 847 | 768 | 100 | 299 | equivalent | none |
| 13 | M | 0.49 | 95 | 100 | 113 | 104 | 69 | 70 | 887 | 770 | 100 | 304 | equivalent | none |
| 14 | N | 0.30 | 100 | 100 | 120 | 106 | 68 | 69 | 892 | 748 | 96 | 269 | equivalent | none |
| 15 | O | 0.39 | 100 | 100 | 124 | 106 | 68 | 69 | 813 | 777 | 98 | 373 | equivalent | none |
| 16 | B | 0.99 | 100 | 100 | 123 | 110 | 68 | 68 | 771 | 765 | 98 | 312 | equivalent | none |
| Comparative Example | | | | | | | | | | | | | | | |
| 17 | P | 1.25 | 81 | 89 | 199 | 133 | 45 | 59 | 854 | 760 | 92 | 307 | equivalent | none |
| 18 | P | 0.33 | 64 | 100 | 151 | 129 | 61 | 65 | 758 | 760 | 92 | 307 | equivalent | none |
| 19 | Q | 0.33 | 100 | 100 | 134 | 111 | 63 | 65 | 752 | 770 | 100 | 342 | equivalent | none |
| 20 | R | 0.37 | 92 | 100 | 97 | 95 | 70 | 71 | 765 | 538 | 73 | 229 | equivalent | none |
| 21 | S | 0.35 | 100 | 100 | 102 | 99 | 70 | 71 | 809 | 538 | 76 | 237 | equivalent | none |
| 22 | T | 0.43 | 100 | 100 | 110 | 103 | 68 | 68 | 873 | 399 | 66 | 212 | equivalent | none |
| 23 | U | 0.43 | 100 | 96 | 134 | 113 | 64 | 65 | 845 | 802 | 100 | 433 | equivalent | none |
| 24 | V | 0.31 | 100 | 100 | 78 | 76 | 70 | 72 | 808 | 355 | 92 | 182 | equivalent | none |
| 25 | W | 0.31 | 100 | 100 | 110 | 102 | 66 | 67 | 851 | 548 | 94 | 215 | equivalent | occur |
| 26 | X | 0.31 | 100 | 100 | 133 | 121 | 66 | 67 | 796 | 765 | 98 | 293 | equivalent | none |
| 27 | Y | 0.39 | 100 | 100 | 113 | 102 | 68 | 69 | 864 | 538 | 94 | 204 | equivalent | occur |
| 28 | Z | 0.40 | 100 | 100 | 112 | 102 | 68 | 69 | 820 | 765 | 98 | 238 | equivalent | occur |

TABLE 3

| | | | Steel for Carburizing | | | | | |
| --- | --- | --- | --- | --- | --- | --- | --- | --- |
| | | | Production Result | | Evaluation Result | | | |
| | | | | | Microstructure of Surface Layer | | Hardness | |
| | | | Finish Temperature | Attained Surface | Total Fraction Ferrite and | Cementites | | |
| | | | at Hot Controlled Rolling Process | Temperature at Rapid Cooling Process | Pearlite after Self-reheating Process | with Aspect Ratio of 3 or less after SA Process | after Slow Cooling Process | after SA Process |
| | Production No. | Steel No. | (° C.) | (° C.) | (%) | (%) | (HV) | (HV) |
| Example | 29 | B | 1000 | 400 | 0 | 100 | 119 | 103 |
| | 30 | B | 700 | 400 | 0 | 100 | 109 | 104 |
| | 31 | B | 850 | 400 | 0 | 100 | 116 | 104 |
| | 32 | B | 850 | 500 | 8 | 97 | 114 | 106 |
| | 33 | B | 850 | 300 | 0 | 100 | 120 | 104 |
| | 34 | B | 850 | 600 | 70 | 95 | 114 | 103 |
| | 35 | B | 700 | 300 | 50 | 91 | 117 | 99 |
| | 36 | B | 850 | 400 | 0 | 99 | 116 | 104 |

| | | Steel for Carburizing Evaluation Result Critical Working Ratio | | Carburized Steel Component Evaluation Result | | | | |
| --- | --- | --- | --- | --- | --- | --- | --- | --- |
| | | | | Carburized Layer | | | Steel Portion | |
| | | after Slow Cooling Process | after SA Process | Hardness at 50 μm in depth | Hardness at 0.4 mm in depth | Martensite Fraction at 0.4 mm in depth | Hardness at 2 mm in depth | Chemical Composition at 2 mm in depth |
| | Production No. | (%) | (%) | (HV) | (HV) | (%) | (HV) | |
| Example | 29 | 73 | 74 | 781 | 725 | 94 | 312 | equivalent |
| | 30 | 72 | 74 | 813 | 747 | 96 | 312 | equivalent |
| | 31 | 72 | 74 | 779 | 759 | 100 | 312 | equivalent |
| | 32 | 70 | 71 | 789 | 766 | 100 | 312 | equivalent |
| | 33 | 73 | 73 | 744 | 742 | 98 | 312 | equivalent |
| | 34 | 70 | 71 | 785 | 733 | 95 | 312 | equivalent |
| | 35 | 71 | 71 | 770 | 738 | 95 | 312 | equivalent |
| | 36 | 68 | 68 | 794 | 741 | 96 | 312 | equivalent |

The invention claimed is:

1. A steel for a carburizing comprising as a chemical composition, by mass %,
C: 0.07% to 0.13%,
Si: 0.0001% to 0.50%,
Mn: 0.0001% to 0.80%,
S: 0.0001% to 0.100%,
Cr: more than 1.30% to 5.00%,
B: 0.0005% to 0.0100%,
Al: 0.105% to 0.200%,
N: 0.0030% to 0.0100%,
Ti: limited to 0.020% or less,
P: limited to 0.050% or less,
O: limited to 0.0030% or less, and
a balance consisting of iron and unavoidable impurities, wherein:
amounts expressed in mass % of each element in the chemical composition satisfy simultaneously a following Equation 1 as a hardness parameter, a following Equation 2 as a hardenability parameter, and a following Equation 3 as an AlN precipitation parameter;
a shape is a bar or a wire rod in which a cross section perpendicular to a longitudinal direction is round; and
when a distance from a periphery to a center of the cross section is defined as r in unit of mm, in a metallographic structure of a surface layer which is a portion from the periphery to r×0.01, a ferrite and a pearlite are limited before spheroidizing annealing, by area %, to 10% or less in total, and a balance includes at least one of martensite, bainite, tempered martensite, tempered bainite, and cementites, $$0.10 < C + 0.194 \times Si + 0.065 \times Mn + 0.012 \times Cr + 0.078 \times Al < 0.235 \quad \text{(Equation 1)}$$

$$7.5 < (0.7 \times Si + 1) \times (5.1 \times Mn + 1) \times (2.16 \times Cr + 1) < 44 \quad \text{(Equation 2)}$$

$$0.0003 < Al \times (N - Ti \times (14/48)) < 0.0011 \quad \text{(Equation 3), and}$$

the hardness at a position at a depth which is ¼ of a diameter of the cross section from the periphery of the steel for carburizing measured before spheroidizing annealing is HV 125 or less.

2. The steel for the carburizing according to claim 1, further comprising as the chemical composition, by mass %, at least one of
Nb: 0.002% to 0.100%,
V: 0.002% to 0.20%,
Mo: 0.005% to 0.50%,
Ni: 0.005% to 1.00%,
Cu: 0.005% to 0.50%,
Ca: 0.0002% to 0.0030%,
Mg: 0.0002% to 0.0030%, Te: 0.0002% to 0.0030%,
Zr: 0.0002% to 0.0050%,
Rare Earth Metal: 0.0002% to 0.0050%, and
Sb: 0.002% to 0.050%, wherein
the hardness parameter is defined as a following Equation 4 on behalf of the Equation 1 and the hardenability parameter is defined as a following Equation 5 on behalf of the Equation 2, $$0.10 < C + 0.194 \times Si + 0.065 \times Mn + 0.012 \times Cr + 0.033 \times Mo + 0.067 \times Ni + 0.097 \times Cu + 0.078 \times Al < 0.235 \quad \text{(Equation 4)}$$

$$7.5 < (0.7 \times Si + 1) \times (5.1 \times Mn + 1) \times (2.16 \times Cr + 1) \times (3 \times Mo + 1) \times (0.3633 \times Ni + 1) < 44 \quad \text{(Equation 5)}.$$

3. A steel for a carburizing comprising as a chemical composition, by mass %,
C: 0.07% to 0.13%,
Si: 0.0001% to 0.50%,
Mn: 0.0001% to 0.80%,
S: 0.0001% to 0.100%,
Cr: more than 1.30% to 5.00%,
B: 0.0005% to 0.0100%,
Al: 0.105% to 0.200%,
N: 0.0030% to 0.0100%,
Ti: limited to 0.020% or less,
P: limited to 0.050% or less,
O: limited to 0.0030% or less, and
a balance consisting of iron and unavoidable impurities, wherein:
amounts expressed in mass % of each element in the chemical composition satisfy simultaneously a following Equation 1 as a hardness parameter, a following Equation 2 as a hardenability parameter, and a following Equation 3 as an MN precipitation parameter;
a shape is a bar or a wire rod in which a cross section perpendicular to a longitudinal direction is round; and $$0.10 < C + 0.194 \times Si + 0.065 \times Mn + 0.012 \times Cr + 0.078 \times Al < 0.235 \quad \text{(Equation 1)}$$

$$7.5 < (0.7 \times Si + 1) \times (5.1 \times Mn + 1) \times (2.16 \times Cr + 1) < 44 \quad \text{(Equation 2)}$$

$$0.0003 < Al \times (N - Ti \times (14/48)) < 0.0011 \quad \text{(Equation 3), and}$$

when a distance from a periphery to a center of the cross section is defined as r in units of mm, in cementites included in a metallographic structure of a surface layer which is a portion from the periphery to r×0.01, the cementites of 90% to 100% are cementites whose aspect ratio is 3 or less, and the hardness at a position at a depth which is ¼ of a diameter of the cross section from the periphery of the steel for carburizing measured after spheroidizing annealing is HV 110 or less.

4. A method of producing the steel for the carburizing according to claim 1, the method comprising,
a casting process to obtain a bloom,
a hot working process of hot-working the bloom to obtain a hot worked steel material, and
a slow cooling process of slow-cooling by a cooling rate of more than 0° C./s to 1° C./s in a temperature range where a surface temperature of the hot worked steel material is 800° C. to 500° C. after the hot working process.

5. The method of producing the steel for the carburizing according to claim 4, the method further comprising,
a spheroidizing annealing process of spheroidizing-annealing the hot-worked steel material after the slow cooling process.

6. A method of producing the steel for the carburizing according to claim 1, the method comprising,
a casting process to obtain a bloom,
a hot controlled rolling process of hot-rolling the bloom by controlling conditions so that a surface temperature at an exit side of a final finish rolling becomes 700° C. to 1000° C. to obtain a hot-controlled-rolled steel material,
a rapid cooling process of rapid-cooling so that the surface temperature of the hot-controlled-rolled steel material is more than 0° C. to 500° C. after the hot controlled rolling process, and
a heating process of heating the hot-controlled-rolled steel material after the rapid cooling process at least one time or more.

7. The method of producing the steel for the carburizing according to claim 6, the method further comprising,
a spheroidizing annealing process of spheroidizing-annealing the hot-controlled-rolled steel material after the heating process.

8. A method of producing the steel for the carburizing according to claim 2, the method comprising,
a casting process to obtain a bloom,
a hot working process of hot-working the bloom to obtain a hot worked steel material, and
a slow cooling process of slow-cooling by a cooling rate of more than 0° C./s to 1° C./s in a temperature range where a surface temperature of the hot worked steel material is 800° C. to 500° C. after the hot working process.

9. The method of producing the steel for the carburizing according to claim 8, the method further comprising,
a spheroidizing annealing process of spheroidizing-annealing the hot-worked steel material after the slow cooling process.

10. A method of producing the steel for the carburizing according to claim 2, the method comprising,
a casting process to obtain a bloom,
a hot controlled rolling process of hot-rolling the bloom by controlling conditions so that a surface temperature at an exit side of a final finish rolling becomes 700° C. to 1000° C. to obtain a hot-controlled-rolled steel material,
a rapid cooling process of rapid-cooling so that the surface temperature of the hot-controlled-rolled steel material is more than 0° C. to 500° C. after the hot controlled rolling process, and
a heating process of heating the hot-controlled-rolled steel material after the rapid cooling process at least one time or more.

11. The method of producing the steel for the carburizing according to claim 10, the method further comprising,
a spheroidizing annealing process of spheroidizing-annealing the hot-controlled-rolled steel material after the heating process.

12. The steel for the carburizing according to claim 3, further comprising as the chemical composition, by mass %, at least one of
Nb: 0.002% to 0.100%,
V: 0.002% to 0.20%,
Mo: 0.005% to 0.50%,
Ni: 0.005% to 1.00%,
Cu: 0.005% to 0.50%,
Ca: 0.0002% to 0.0030%,
Mg: 0.0002% to 0.0030%, Te: 0.0002% to 0.0030%,
Zr: 0.0002% to 0.0050%,
Rare Earth Metal: 0.0002% to 0.0050%, and
Sb: 0.002% to 0.050%, wherein
the hardness parameter is defined as a following Equation 4 on behalf of the Equation 1 and the hardenability parameter is defined as a following Equation 5 on behalf of the Equation 2, $$0.10 < C+0.194 \times Si+0.065 \times Mn+0.012 \times Cr+0.033 \times Mo+0.067 \times Ni+0.097 \times Cu+0.078 \times Al < 0.235 \quad \text{(Equation 4)}$$

$$7.5 < (0.7 \times Si+1) \times (5.1 \times Mn+1) \times (2.16 \times Cr+1) \times (3 \times Mo+1) \times (0.3633 \times Ni+1) < 44 \quad \text{(Equation 5).}$$

13. A steel for a carburizing comprising as a chemical composition, by mass %,
C: 0.07% to 0.13%,
Si: 0.0001% to 0.50%,
Mn: 0.0001% to 0.80%,
S: 0.0001% to 0.100%,
Cr: more than 1.30% to 5.00%,
B: 0.0005% to 0.0100%,
Al: 0.105% to 0.200%,
N: 0.0030% to 0.0100%,
Ti: limited to 0.020% or less,
P: limited to 0.050% or less,
O: limited to 0.0030% or less, and
a balance comprising iron and unavoidable impurities, wherein:
amounts expressed in mass % of each element in the chemical composition satisfy simultaneously a following Equation 1 as a hardness parameter, a following Equation 2 as a hardenability parameter, and a following Equation 3 as an AlN precipitation parameter;
a shape is a bar or a wire rod in which a cross section perpendicular to a longitudinal direction is round; and
when a distance from a periphery to a center of the cross section is defined as r in unit of mm, in a metallographic structure of a surface layer which is a portion from the periphery to r×0.01, a ferrite and a pearlite are limited before spheroidizing annealing, by area %, to 10% or less in total, and a balance includes at least one of martensite, bainite, tempered martensite, tempered bainite, and cementites, $$0.10 < C+0.194 \times Si+0.065 \times Mn+0.012 \times Cr+0.078 \times Al < 0.235 \quad \text{(Equation 1)}$$

$$7.5 < (0.7 \times Si+1) \times (5.1 \times Mn+1) \times (2.16 \times Cr+1) < 44 \quad \text{(Equation 2)}$$

$$0.0003 < Al \times (N-Ti \times (14/48)) < 0.0011 \quad \text{(Equation 3), and}$$

the hardness at a position at a depth which is ¼ of a diameter of the cross section from the periphery of the steel for carburizing measured before spheroidizing annealing is HV 125 or less.

14. A steel for a carburizing comprising as a chemical composition, by mass %,
C: 0.07% to 0.13%,
Si: 0.0001% to 0.50%,
Mn: 0.0001% to 0.80%,
S: 0.0001% to 0.100%,
Cr: more than 1.30% to 5.00%,
B: 0.0005% to 0.0100%,
Al: 0.105% to 0.200%,
N: 0.0030% to 0.0100%,
Ti: limited to 0.020% or less,
P: limited to 0.050% or less,
O: limited to 0.0030% or less, and
a balance comprising iron and unavoidable impurities, wherein:
amounts expressed in mass % of each element in the chemical composition satisfy simultaneously a following Equation 1 as a hardness parameter, a following Equation 2 as a hardenability parameter, and a following Equation 3 as an AlN precipitation parameter;
a shape is a bar or a wire rod in which a cross section perpendicular to a longitudinal direction is round; and $$0.10 < C+0.194 \times Si+0.065 \times Mn+0.012 \times Cr+0.078 \times Al < 0.235 \quad \text{(Equation 1)}$$

$$7.5 < (0.7 \times Si+1) \times (5.1 \times Mn+1) \times (2.16 \times Cr+1) < 44 \quad \text{(Equation 2)}$$

$$0.0003 < Al \times (N-Ti \times (14/48)) < 0.0011 \quad \text{(Equation 3), and}$$

when a distance from a periphery to a center of the cross section is defined as r in units of mm, in cementites included in a metallographic structure of a surface layer which is a portion from the periphery to r×0.01, the cementites of 90% to 100% are cementites whose aspect ratio is 3 or less, and the hardness at a position at a depth which is ¼ of a diameter of the cross section from the periphery of the steel for carburizing measured after spheroidizing annealing is HV 110 or less.

* * * * *